(12) United States Patent
Ikeda et al.

(10) Patent No.: US 10,203,647 B2
(45) Date of Patent: Feb. 12, 2019

(54) BEARING MEMBER, END MEMBER, PHOTORECEPTOR DRUM UNIT, DEVELOPING ROLLER UNIT, PROCESS CARTRIDGE, AND MANUFACTURING METHOD OF BEARING MEMBER

(71) Applicant: Mitsubishi Chemical Corporation, Chiyoda-ku (JP)

(72) Inventors: Shuichi Ikeda, Kanagawa (JP); Yohei Matsuoka, Kanagawa (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 15/984,498

(22) Filed: May 21, 2018

(65) Prior Publication Data

US 2018/0275591 A1  Sep. 27, 2018

Related U.S. Application Data

(63) Continuation of application No. 15/369,931, filed on Dec. 6, 2016, now Pat. No. 10,007,223, which is a
(Continued)

(30) Foreign Application Priority Data

Jun. 6, 2014  (JP) .................. 2014-118083

(51) Int. Cl.
*G03G 15/00* (2006.01)
*F16D 3/26* (2006.01)
*G03G 21/16* (2006.01)

(52) U.S. Cl.
CPC ............. *G03G 15/757* (2013.01); *F16D 3/26* (2013.01); *G03G 21/1647* (2013.01)

(58) Field of Classification Search
CPC ............. G03G 15/0808; G03G 15/751; G03G 15/757; G03G 21/1864; G03G 21/186;
(Continued)

(56) References Cited

U.S. PATENT DOCUMENTS 6,574,446 B2   6/2003   Kitayama
6,963,713 B2   11/2005  Isomura et al.
(Continued)

FOREIGN PATENT DOCUMENTS

DE   199 23 320 A1   12/1999
JP   4-216027        8/1992
(Continued)

OTHER PUBLICATIONS

International Search report dated Jun. 30, 2015 in PCT/JP2015/066266, filed on Jun. 4, 2015 (with English Translation).
(Continued)

*Primary Examiner* — Francis C Gray
(74) *Attorney, Agent, or Firm* — Oblon, McClelland, Maier & Neustadt, L.L.P.

(57) ABSTRACT

An end member (40) is disposed in an end portion of a columnar rotating body (20, 306), comprises: a bearing member (41); and a shaft member (70), in which the bearing member includes a main body (45) having a tubular body (46) and a holding portion (50) disposed on an inner side of the tubular body, and an intermediate member (60) held by the holding portion of the main body, in which one end side of the shaft member is held by the intermediate member, the intermediate member is snap-fit jointed to the holding portion of the main body to be rotatable around one axis, and the shaft member is snap-fit jointed to the intermediate member to be rotatable around an axis which is different from the axis of rotation of the intermediate member.

13 Claims, 21 Drawing Sheets

Related U.S. Application Data continuation of application No. PCT/JP2015/066266, filed on Jun. 4, 2015.

(58) Field of Classification Search
CPC .......... G03G 21/1839; G03G 21/1857; G03G 21/18; F16H 55/02
See application file for complete search history.

(56) References Cited

U.S. PATENT DOCUMENTS

| | | | |
|---|---|---|---|
| 6,987,942 | B2 | 1/2006 | Yoshikawa et al. |
| 7,190,925 | B2 | 3/2007 | Isomura et al. |
| 2002/0025191 | A1 | 2/2002 | Kitayama |
| 2004/0033087 | A1 | 2/2004 | Yoshikawa et al. |
| 2004/0052553 | A1 | 3/2004 | Isomura et al. |
| 2005/0025529 | A1 | 2/2005 | Isomura et al. |
| 2009/0317131 | A1* | 12/2009 | Morioka ............ G03G 21/1853 399/117 |
| 2010/0034561 | A1 | 2/2010 | Batori et al. |
| 2010/0142991 | A1 | 6/2010 | Holmes et al. |
| 2010/0209144 | A1 | 8/2010 | Nieda |
| 2011/0038649 | A1* | 2/2011 | Miyabe .............. G03G 15/0896 399/119 |
| 2011/0217073 | A1 | 9/2011 | He |
| 2011/0318054 | A1 | 12/2011 | Fukuzawa et al. |
| 2012/0121289 | A1 | 5/2012 | Kamimura |
| 2012/0183331 | A1* | 7/2012 | Huang ................. G03G 15/757 399/167 |
| 2014/0119778 | A1 | 5/2014 | Morgan |
| 2014/0165761 | A1* | 6/2014 | Ishio .................. G03G 21/1647 74/431 |
| 2015/0110522 | A1* | 4/2015 | Ikeda ........................ F16D 1/06 399/111 |

FOREIGN PATENT DOCUMENTS

| | | |
|---|---|---|
| JP | 2002-48148 | 2/2002 |
| JP | 2004-4792 | 1/2004 |
| JP | 2010-26473 | 2/2010 |
| JP | 2010-222780 | 10/2010 |
| JP | 2012-103621 | 5/2012 |
| JP | 2013-195961 | 9/2013 |
| JP | 2014-52618 | 3/2014 |

OTHER PUBLICATIONS

Written Opinion dated Jun. 30, 2015 in PCT/JP2015/066266, filed on Jun. 4, 2015.
Technical Disclosure No. 2010-502200, issued Apr. 22, 2010, 31 pages.
Technical Disclosure No. 2010-502197, issued Apr. 22, 2010, 18 pages.
Extended European Search Report dated May 18, 2017 in Patent Application No. 15802595.7.
Japanese Office Action dated Oct. 11, 2017 in Japanese Patent Application No. 2014-118083 (with English translation).

* cited by examiner

BEARING MEMBER, END MEMBER, PHOTORECEPTOR DRUM UNIT, DEVELOPING ROLLER UNIT, PROCESS CARTRIDGE, AND MANUFACTURING METHOD OF BEARING MEMBER

This is a continuation of U.S. application Ser. No. 15/369,931, filed Dec. 6, 2016, which is a continuation of International application no. PCT/JP2015/066266, filed Jun. 4, 2015, which claims priority to Japanese patent application no. 2014-118083, filed Jun. 6, 2014, of which all of the disclosures are incorporated herein by reference in their entireties.

TECHNICAL FIELD

The present invention relates to a process cartridge which is provided to be attachable to and detachable from an image forming apparatus, such as a laser printer or a copying machine, a photoreceptor drum unit which is provided in the process cartridge, a developing roller unit, an end member which is attached to a drum, a bearing member which constitutes the end member, and a manufacturing method of the bearing member.

BACKGROUND ART

In an image forming apparatus, such as a laser printer or a copying machine, a process cartridge which is attachable to and detachable from a main body of the image forming apparatus (hereinafter, referred to as an "apparatus main body") is provided.

The process cartridge is a member which forms content to be expressed, such as letters or figures and transfers the content to a recording medium, such as a paper sheet. More specifically, the process cartridge includes a photoreceptor drum, and, the content to be transferred is formed on the photoreceptor drum. In addition, in the process cartridge, various means for forming the content to be transferred to the photoreceptor drum are also disposed. Examples of these means include a developing roller unit, a charging roller unit, and means for performing cleaning.

In regard to the process cartridge, the same process cartridge is attached to and detached from the apparatus main body in maintenance, or a new process cartridge is mounted on the apparatus main body after an old process cartridge is disengaged from the apparatus main body. The attachment and detachment of the process cartridge can be performed by users of the image forming apparatus manually, and thus, it is desirable that the attachment and detachment can be easily performed as much as possible.

However, a driving shaft of the apparatus main body is engaged with the photoreceptor drum which is included in the process cartridge directly or via another member, and according to this, the photoreceptor drum receives a rotating force from the driving shaft and rotates. An end member which receives the rotating force from the driving shaft and transmits the rotating force to the photoreceptor drum is disposed in an end portion of the photoreceptor drum. Therefore, in order to attach and detach the process cartridge to and from the apparatus main body, it is necessary to release (disengage) the engagement between the driving shaft of the apparatus main body and the end member, and to reengage (mount) the process cartridge for every attachment and detachment.

Here, if it is possible to move the photoreceptor drum (process cartridge) in a direction along an axis of the driving shaft of the apparatus main body, and to attach and detach the photoreceptor drum to and from the driving shaft, an apparatus configuration for the attachment and detachment is relatively simple. However, from the viewpoint of reducing the size of the image forming apparatus and ensuring space for the attachment and detachment of the process cartridge, it is preferable that the process cartridge is disengaged from the apparatus main body by pulling out the process cartridge in a direction which is different from the direction along the axis of the driving shaft, and that the process cartridge is mounted on the apparatus main body by pushing the process cartridge in a direction opposite to this.

In PTL 1, a configuration for attaching and detaching a process cartridge in a direction which is different from a direction along an axis of a driving shaft of an apparatus main body is disclosed. Specifically, a coupling member (shaft member) which is disclosed in PTL 1 and is provided in an end member is swingably attached to a drum flange (bearing member) with a spherical portion provided therein. Therefore, a part (rotating force receiving member) which is provided in the coupling member (shaft member) and is engaged with the driving shaft of the apparatus main body can swing around the spherical portion to change an angle with respect to the axis of the photoreceptor drum, and mounting and disengagement between the driving shaft of the apparatus main body and the photoreceptor drum become easier.

In addition, NPL 1 discloses a structure in which a groove for introducing a rotating force transmission pin provided in a shaft member in an end member into a bearing member, is provided in an inner circumference of the bearing member along a rotational direction, and the groove facilitates the attaching of the rotating force transmission pin to the bearing member.

In NPL 2, a cruciform member (intermediate member) which links a coupling member (shaft member) to an end member (bearing member main body) such that the coupling member becomes swingable, is disclosed. Accordingly, the coupling member (shaft member) can freely swing with respect to an axis of the end member (bearing member main body).

In NPL 2, a coupling (shaft member) which is formed in a substantially tubular shape and links a driving shaft and a driven shaft, is disclosed. A part to be engaged with a pin of the driving shaft and a part to be engaged with a pin of the driven shaft, are provided in the coupling (shaft member), and a rotating force is transmitted with each pin being engaged with the coupling (shaft member).

CITATION LIST

Patent Literature

[PTL 1] JP-A-2010-26473
[PTL 2] JP-A-2002-48148

Non Patent Literature

[NPL 1] Technical Disclosure No. 2010-502200, published by Japan Institute of Invention and Innovation
[NPL 2] Technical Disclosure No. 2010-502197, published by Japan Institute of Invention and Innovation

SUMMARY OF INVENTION

Technical Problem

However, with the inventions described in PTL 1 and in NPL 1, it is difficult to realize smooth attachment of the shaft member to the bearing member, smooth swing of the shaft member, and smooth attachment and detachment of the shaft member to and from the apparatus main body. In association with this, high accuracy is required for each member to achieve necessary functions, and there is a large influence due to non-uniformity in quality of the shaft member.

In addition, the coupling member (shaft member) and the drum flange (bearing member) which holds the coupling member described in PTL 1 are configured such that the spherical portion is directly held by the drum flange and the coupling member (shaft member) can swing. Therefore, it is necessary to forcibly insert and forcibly remove the spherical portion with a strong force when attaching the spherical portion to the drum flange (bearing member). In addition, there is a concern that the shaft member may be damaged due to the forcible inserting and forcible removing with a strong force, workability is also not excellent, and there is an influence on reuse of the shaft member.

Meanwhile, in the structure described in NPL 1, there is also a case where the inclination angle of the shaft member when the shaft member swings is restricted, and a sufficient angle of swing is not achieved. Accordingly, there is a case where smooth attachment and detachment of the process cartridge is interfered with, and it becomes difficult to reduce the size of the image forming apparatus.

In addition, in the inventions described in NPL 2 and in PTL 2, the shaft member (the coupling member in NPL 2, the coupling in PTL 2) does not include one spherical portion unlike PTL 1 and NPL 1, and cannot be employed in a case where the shaft member having the spherical portion is desired to be reused. In addition, assemblability is not considered in the structure described in the literatures, and it is demanded to improve productivity or the assemblability and disassemblability for reuse. Furthermore, regarding the productivity, a specific method of integrally forming the bearing member main body by the structure of the disclosed bearing member main body, is not described.

In addition, in the structure of the coupling (shaft member) described in PTL 2, a direction or a range of swing is limited, and desired swing is not achieved. Accordingly, the phase of the photoreceptor drum when attaching and detaching the process cartridge to and from the apparatus main body is limited, and for example, there is a possibility that the process cartridge may not be able to be detached when the image forming apparatus is stopped due to paper jamming or the like, and there is also a situation where workability is significantly degraded.

Here, in consideration of the above-described problems, an object of the present invention is to provide an end member which operates more smoothly, is unlikely to be influenced by non-uniformity in the quality of the shaft member, and has excellent assemblability, disassemblability and productivity, and with which transmission of the rotating force which is the same as that in the related art, and attachment to and detachment from the apparatus main body are possible. In addition, an object of the present invention is to provide a bearing member, a photoreceptor drum unit, a developing roller unit, and a process cartridge.

Solution to Problem

Hereinafter, the present invention will be described. Here, reference numerals of the drawings are written in parenthesis for easy understanding, but the present invention is not limited thereto.

According to the present invention, there is provided an end member (40) which is disposed in an end portion of a columnar rotating body (20, 306), comprising: a bearing member (41); and a shaft member (70), in which the bearing member includes a main body (45) having a tubular body (46) and a holding portion (50) disposed on an inner side of the tubular body, and an intermediate member (60) held by the holding portion of the main body, in which one end side of the shaft member is held by the intermediate member, the intermediate member is snap-fit jointed to the holding portion of the main body to be rotatable around one axis, and the shaft member is snap-fit jointed to the intermediate member to be rotatable around an axis which is different from the axis of rotation of the intermediate member.

Here, the "columnar rotating body" means a solid rotating body which has a shape of a so-called round rod and rotates around the axis, and a hollow rotating body which has a so-called cylinder shape, and rotates around the axis.

In the end member (40) according to an aspect of the present invention, for example, the shaft member (70) includes a rotating shaft (85), a rotating force receiving portion (71) which is disposed at one end of the rotating shaft and receives a rotating force, a base end portion (90) which is disposed at the other end of the rotating shaft, and a rotating force transmission projection (95) which protrudes from the base end portion, the intermediate member (60) has an annular shape, in which the base end portion is disposed on an inner side of the annular shape, and the intermediate member includes a shaft member linking groove (62) into which the rotating force transmission projection is inserted, and the rotating force transmission projection and the shaft member linking groove are snap-fit jointed to each other.

In the end member (40) according to an aspect of the present invention, for example, the base end portion (90) of the shaft member (70) includes a part of a spherical surface, and the base end portion is provided with a void such that the base end portion does not come into contact with the intermediate member (60).

In the end member (40) according to an aspect of the present invention, for example, the intermediate member (60) includes a main body linking projection (61) which is a projection that is inserted into the holding portion (50), the holding portion includes a holding groove (52) which is a groove into which the main body linking projection is inserted, and the main body linking projection and the holding groove are snap-fit jointed to each other.

In the end member (40) according to an aspect of the present invention, for example, the axis of rotation of the intermediate member (60) and the axis of rotation of the shaft member (70) are disposed on the same plane.

According to the present invention, there is provided a bearing member (41) which is included in an end member (40) disposed in an end portion of a columnar rotating body (20, 306), including: a main body (45) which has a tubular body (46) and a holding portion (50) disposed on an inner side of the tubular body; and an intermediate member (60) which is held by the holding portion of the main body, in which the intermediate member is snap-fit jointed to the holding portion of the main body to be rotatable around one axis.

According to the present invention, there is provided a bearing member (41) which is included in an end member (40) disposed in an end portion of a columnar rotating body (20, 306), including: a main body (45) which has a tubular body (46) and a holding portion (50) disposed on an inner side of the tubular body, in which the holding portion includes a holding groove (52) which is a groove that extends in a direction along a direction in which an axis of the tubular body extends, and in which a snap-fit jointing protrusion portion (52b) is formed at a part in the extending direction of the holding groove.

According to the present invention, there is provided a photoreceptor drum unit (10) including: a photoreceptor drum (20) which is the columnar rotating body; and the above-described end member (40) which is attached to at least one end portion in an axial direction of the photoreceptor drum.

According to the present invention, there is provided a developing roller unit (305) including: a developing roller (306) which is the columnar rotating body; and the above-described end member (40) which is attached to at least one end portion in an axial direction of the developing roller.

According to the present invention, there is provided a process cartridge including: a housing; and the above-described photoreceptor drum unit (10) which is held by the housing.

According to the present invention, there is provided a process cartridge including a housing; and the above-described developing roller unit (305) which is held by the housing.

According to the present invention, there is provided a manufacturing method of a bearing member which is a method of manufacturing the bearing member (41), comprising forming the holding groove (52) of the bearing member by an injection molding, in which the injection molding is performed by combining a protrusion portion (131), which does not include an undercut portion and is provided in a first mold (130) and a protrusion portion (152), which does not include an undercut portion and is provided in a second mold (150), and a mold release is performed by pulling apart the first mold and the second mold in opposite directions.

According to the present invention, there is provided a manufacturing method of a bearing member which is a method of manufacturing the bearing member (41), comprising forming the holding groove (52) of the bearing member by an injection molding, in which the injection molding is performed by protruding a mold portion (232b) which is a piece having a shape of the holding groove, in a direction different from a releasing direction from a surface of a mold (230), and a mold release is performed after burying the mold portion into the surface of the mold.

Advantageous Effects of Invention

According to the end member, the bearing member, the photoreceptor drum unit, the developing roller unit, and the process cartridge of the present invention, since the swing of the shaft member at least in one direction is caused by the swing between the intermediate member and the main body, the swing of the shaft member becomes smooth. Since the swing is not related to the shape of the shaft member, it is possible to ensure sufficiently smooth swing even when there is slight dimensional non-uniformity or the like in the shaft member. In addition, since the intermediate member and the main body are linked to each other by snap-fit jointing, the assemblability and disassemblability are excellent, and reusing properties and productivity are also excellent.

In addition, according to the manufacturing method of a bearing member of the present invention, even when the bearing member has a structure for snap-fit jointing, it is possible to easily manufacture the bearing member by injection molding.

DESCRIPTION OF EMBODIMENTS

Figure 1:
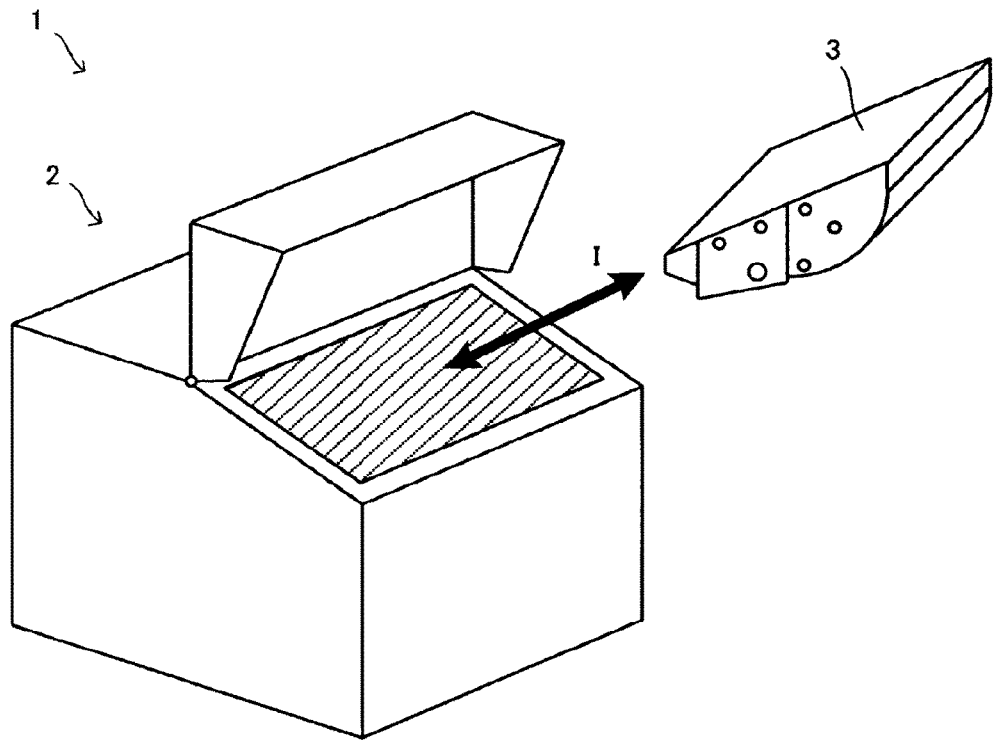
FIG. 1 is a conceptual view of an image forming apparatus main body 2 and a process cartridge 3.

The above-described effects and advantages of the present invention are apparent from the embodiments of the invention which will be described in the following. Hereinafter, the present invention will be described based on the embodiments illustrated in the drawings. However, the present invention is not limited to the embodiments. In addition, for the description, in each drawing, as necessary, members are omitted and projected, and shapes are exaggerated. In addition, there is a case where a surface which becomes an end surface on a section is expressed by hatching.

FIG. 1 is a view illustrating one embodiment, and is a perspective view schematically illustrating an image forming apparatus 1 which includes a process cartridge 3 and an image forming apparatus main body 2 (hereinafter, referred to as "apparatus main body 2" in some cases) which is used by mounting the process cartridge 3 thereon. The process cartridge 3 can be mounted on and disengaged from the apparatus main body 2 by being moved in the direction illustrated by I in FIG. 1. In addition, the direction is the direction which is different from an axial direction of a shaft portion 8a (refer to FIG. 15A) of a driving shaft 8 provided in the apparatus main body 2.

Figure 2:
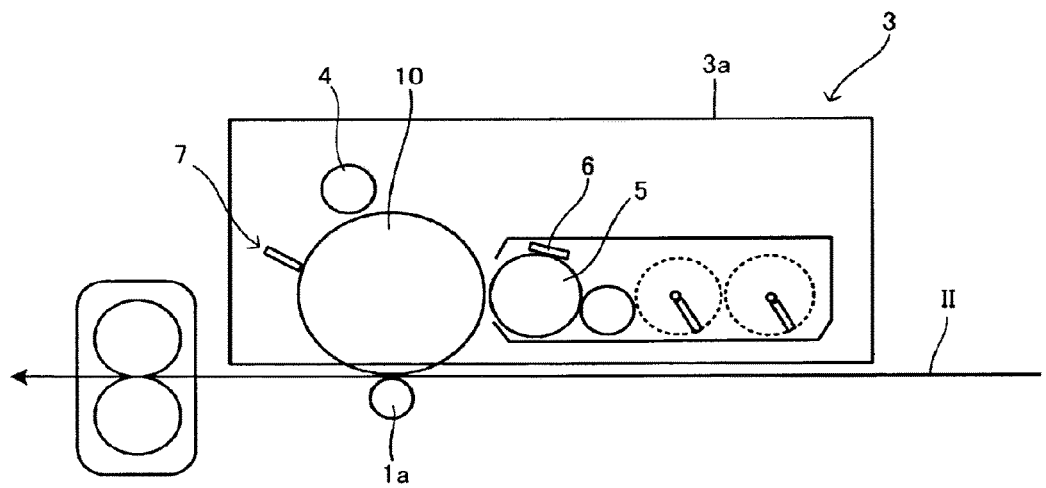
FIG. 2 is a conceptual view illustrating a configuration of the process cartridge 3.

In FIG. 2, a structure of the process cartridge 3 is schematically illustrated. As can be ascertained from FIG. 2, the process cartridge 3 includes a photoreceptor drum unit 10 (refer to FIG. 3), a charging roller unit 4, a developing roller unit 5, a regulating member 6, and a cleaning blade 7, on an inner side of a housing 3a. In a posture in which the process cartridge 3 is mounted on the apparatus main body 2, as a recording medium, such as a paper sheet, moves along line illustrated by II in FIG. 2, an image is transferred to the recording medium from the photoreceptor drum unit 10.

In addition, attachment and detachment of the process cartridge 3 to and from the apparatus main body 2 are performed as in the following. Since the photoreceptor drum unit 10 provided in the process cartridge 3 receives a rotation driving force from the apparatus main body 2 and rotates, a state where the driving shaft 8 (refer to FIG. 15A) of the apparatus main body 2 and an end member 40 (refer to FIG. 3B) of the photoreceptor drum unit 10 are engaged with each other at least during the operation, and the rotating force can be transmitted, is achieved (refer to FIG. 15B).

Meanwhile, when attaching and detaching the process cartridge 3 to and from the apparatus main body 2, it is necessary that the driving shaft 8 and the end member 40 are rapidly engaged to and disengaged from each other not to interfere with the movement or the rotation on the other side regardless of the posture.

In this manner, the end member 40 of the photoreceptor drum unit 10 is appropriately engaged with the driving shaft 8 of the apparatus main body 2, and the rotation driving force is transmitted.

Hereinafter, each configuration will be described.

In the process cartridge 3, as can be ascertained from FIG. 2, the charging roller unit 4, the developing roller unit 5, the regulating member 6, the cleaning blade 7, and the photoreceptor drum unit 10 are provided, and these members are included in the inner side of the housing 3a. Each member will be described in the following.

The charging roller unit 4 charges a photoreceptor drum 20 of the photoreceptor drum unit 10 by applying voltage from the apparatus main body 2. The charging is performed as the charging roller unit 4 rotates following the photoreceptor drum 20 and comes into contact with an outer circumferential surface of the photoreceptor drum 20.

The developing roller unit 5 is a member including a drum which supplies developer to the photoreceptor drum 20. In addition, an electrostatic latent image formed in the photoreceptor drum 20 is developed by the developing roller unit 5. In addition, in the developing roller unit 5, a fixing magnet is embedded.

The regulating member 6 is a member which adjusts an amount of the developer which adheres to the outer circumferential surface of the above-described developing roller unit 5, and imparts a triboelectric charge to the developer itself.

The cleaning blade 7 is a blade which comes into contact with the outer circumferential surface of the photoreceptor drum 20 and removes the developer remaining after the transfer by a tip end thereof.

Figure 3A:
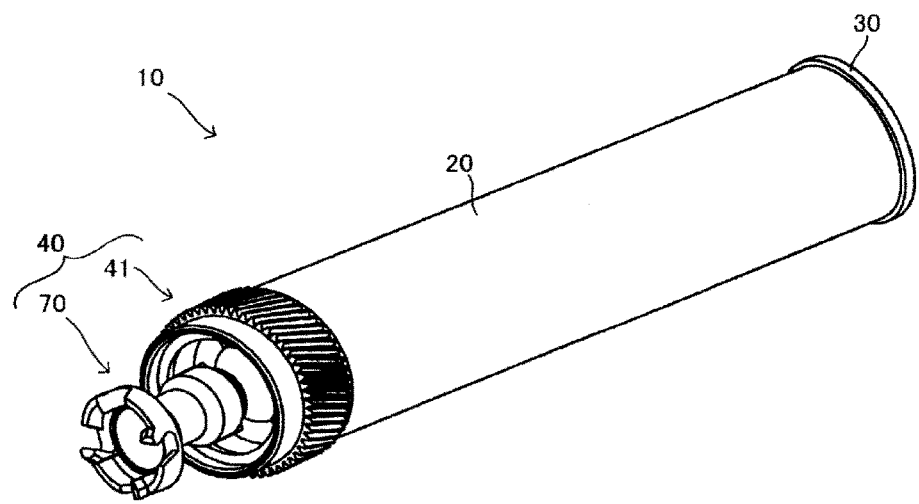
FIG. 3A is an external perspective view of a photoreceptor drum unit 10.
Figure 3B:
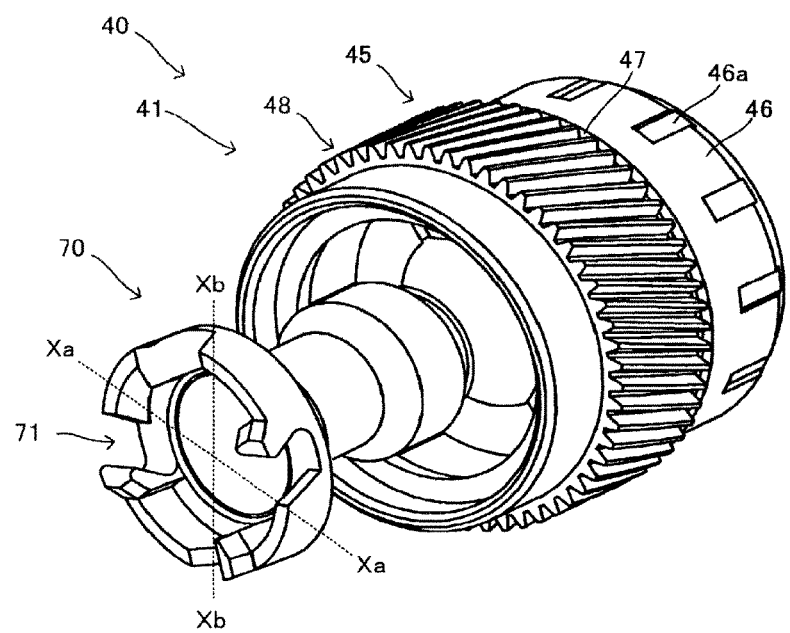
FIG. 3B is an external perspective view of an end member 40.

The photoreceptor drum unit 10 is a member in which letters or figures to be transferred to the recording medium, such as a paper sheet, are formed on a front surface thereof. FIG. 3A illustrates an external perspective view of the photoreceptor drum unit 10. As can be ascertained from FIG. 3A, the photoreceptor drum unit 10 is provided with the photoreceptor drum 20, a lid material 30, and the end member 40. FIG. 3B is a perspective view focusing on the end member 40, and is an exploded perspective view of the end member 40 in FIG. 4. Hereinafter, with reference to FIGS. 3A, 3B, and 4, and appropriate drawings, the photoreceptor drum unit 10 will be described.

The photoreceptor drum 20 is a member which is covered with a photoreceptor layer on an outer circumferential surface of a drum cylinder which has a columnar rotating shape. In other words, the drum cylinder is a conductive cylinder, such as aluminum, and is configured by coating the conductive cylinder with the photoreceptor layer. In the embodiment, the end member 40 is attached to one end of the photoreceptor drum 20 as will be described later, and the lid material 30 is disposed at the other end. Here, the drum cylinder has a hollow cylindrical shape, but may have a shape of a solidly round rod. However, at least a lid member 36 and the end member 40 are formed to be appropriately attached to the end portion of the drum cylinder.

The lid material 30 is a member which is formed of a resin, and a fitting portion which is fitted to the inside of the cylinder of the photoreceptor drum 20, and a bearing portion which is disposed to cover one end surface of the photoreceptor drum 20 are formed coaxially. The bearing portion has a shape of a disk which covers the end surface of the photoreceptor drum 20, and is provided with a part that receives a shaft of the apparatus main body. In addition, an earth plate which is made of a conductive material is disposed in the lid material 30, and according to this, the photoreceptor drum 20 and the apparatus main body 2 are electrically connected to each other.

In addition, in the embodiment, an example of the lid material is described, but the lid material is not limited thereto, and it is possible to employ a lid material which can be generally obtained according to another embodiment. For example, a gear for transmitting the rotating force may be disposed in the lid material.

In addition, the above-described conductive material may be provided on the end member 40 side which will be described later.

The end member 40 is a member which is attached to the end portion on a side opposite to the above-described lid material 30 among the end portions of the photoreceptor drum 20, and is provided with a bearing member 41 and a shaft member 70.

Figure 5:
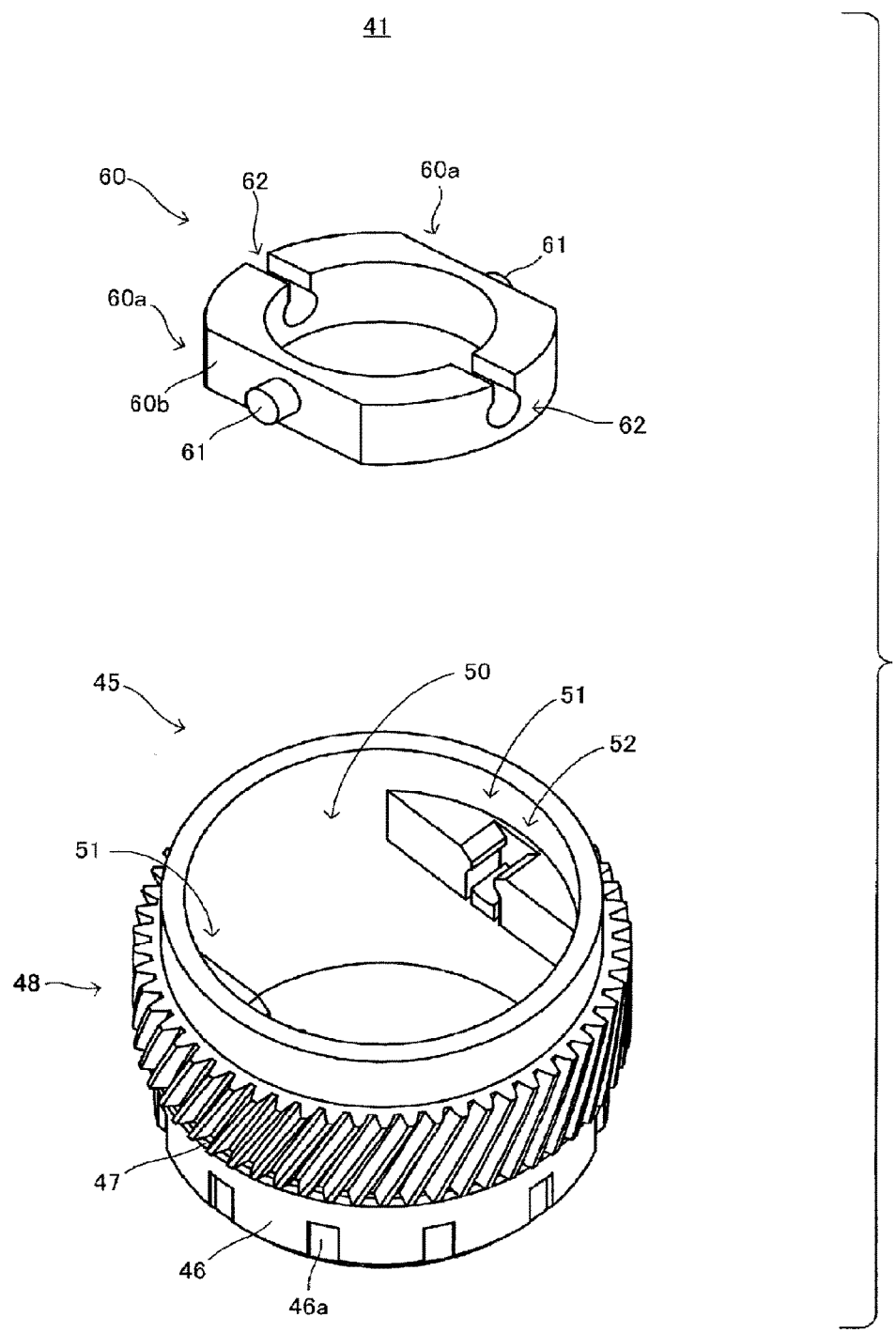
FIG. 5 is an exploded perspective view of a bearing member 41.

The bearing member 41 is a member which is fixed to the end portion of the photoreceptor drum 20. FIG. 5 illustrates an exploded perspective view of the bearing member 41. As can be ascertained from FIG. 5, the bearing member 41 is provided with a main body 45 and an intermediate member 60. Each member will be described later.

Figure 6A:
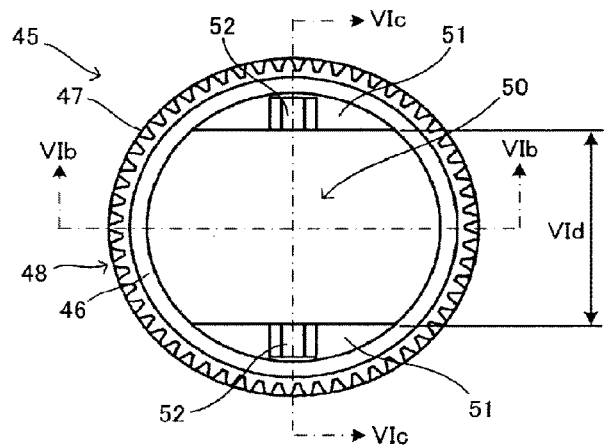
FIG. 6A is a plan view of a main body 45.
Figure 6B:
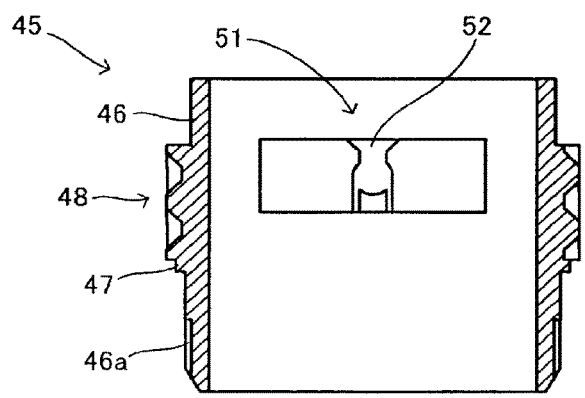
FIG. 6B is one sectional view of the main body 45.
Figure 6C:
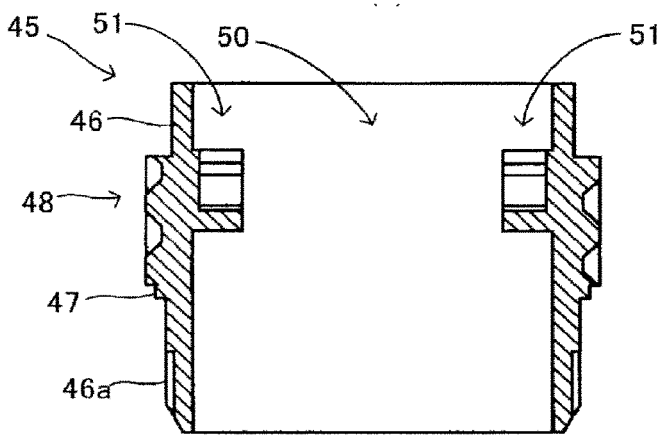
FIG. 6C is another sectional view of the main body 45.

FIG. 6A is a plan view when the main body 45 is viewed from a side on which the intermediate member 60 is inserted, FIG. 6B is a sectional view taken along line VIb-VIb in FIG. 6A, and FIG. 6C is a sectional view taken along line VIc-VIc in FIG. 6A, respectively. FIG. 6B and FIG. 6C are sections which are shifted by 90 degrees around the axis of the main body 45.

Figure 4:
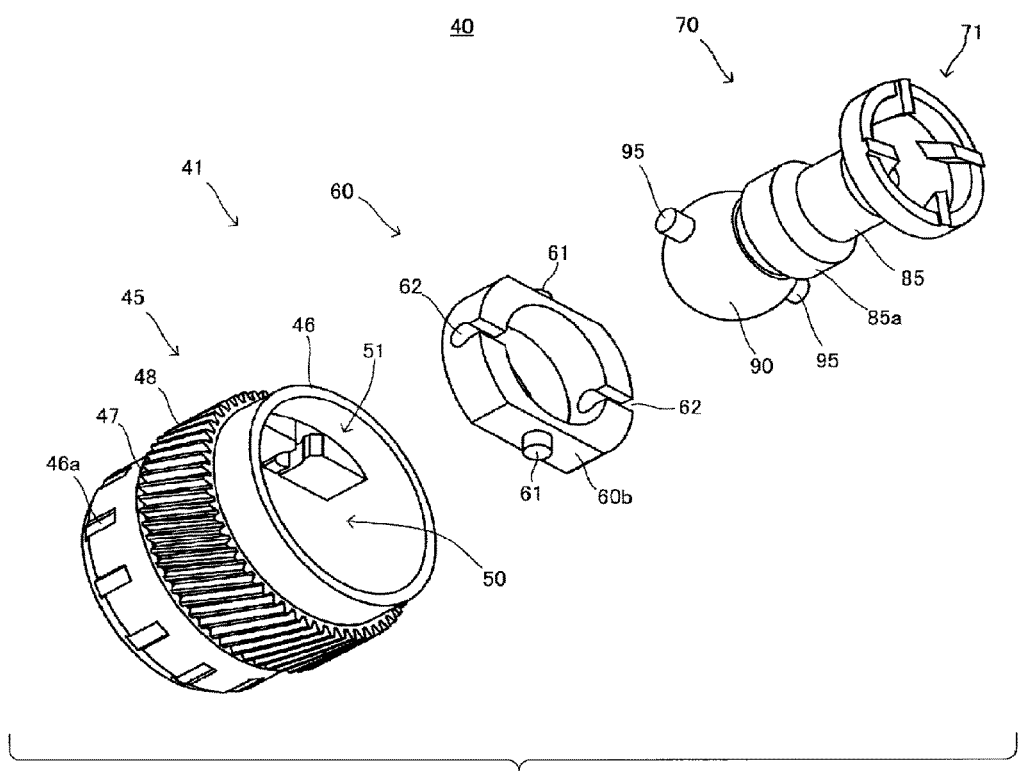
FIG. 4 is an exploded perspective view of the end member 40.

In the embodiment, as can be ascertained from FIGS. 4 to 6, the main body 45 is provided with a tubular body 46 which has a cylindrical shape. In addition, on an outer circumferential surface of the tubular body 46, a contact wall 47 which has a shape of a ring that stands along the outer circumferential surface, and a gear 48 are formed. An outer diameter of the tubular body 46 is generally the same as an inner diameter of the above-described photoreceptor drum 20, and the main body 45 is fixed to the photoreceptor drum 20 by putting one end side of the tubular body 46 into the photoreceptor drum 20 and making the one end side fitted to the photoreceptor drum 20. At this time, the end surface of the photoreceptor drum 20 is inserted until the end surface thereof reaches a part having a depth at which the end surface abuts against the contact wall 47. At this time, an adhesive may be used for more solid fixing. In addition, a groove 46a or a bumpy part may be provided in the tubular body 46 of a part where the adhesive is disposed. Accordingly, the adhesive is held in a groove 46a or a recessed portion, and solider adhesion between the photoreceptor drum 20 and the main body 45 is achieved.

The gear 48 is a gear which transmits the rotating force to the developing roller unit, and in the embodiment, the gear 48 is a helical gear. A type of the gear is not particularly limited, and may be a spur gear. However, the gear is not necessarily provided.

On the tubular inner side of the tubular body 46, a holding portion 50 which holds the shaft member 70 in the main body 45 via the intermediate member 60 is provided.

The holding portion 50 is provided with two holding projections 51 which protrude from a part of the inner wall surface of the tubular body 46, and the two holding projections 51 are disposed to oppose each other nipping the axis of the tubular body 46. A void is formed between the two holding projections 51, and here, the intermediate member 60 is disposed.

Regarding the holding projection 51, the two holding projections 51 which oppose each other nipping the axis of the tubular body 46 function as a pair. In addition, the holding projections 51 which are practically used may be a pair. However, the disposed holding projection 51 may be provided as two pairs of four holding projections, three pairs of six holding projections, and more holding projections. Accordingly, it is possible to improve balance of a behavior (sink or the like) of a material when forming the main body 45 by injection molding, and to form a main body having higher accuracy. Therefore, the number of holding projections may be determined from the viewpoint of behavior of the material when performing the molding.

Figure 7:
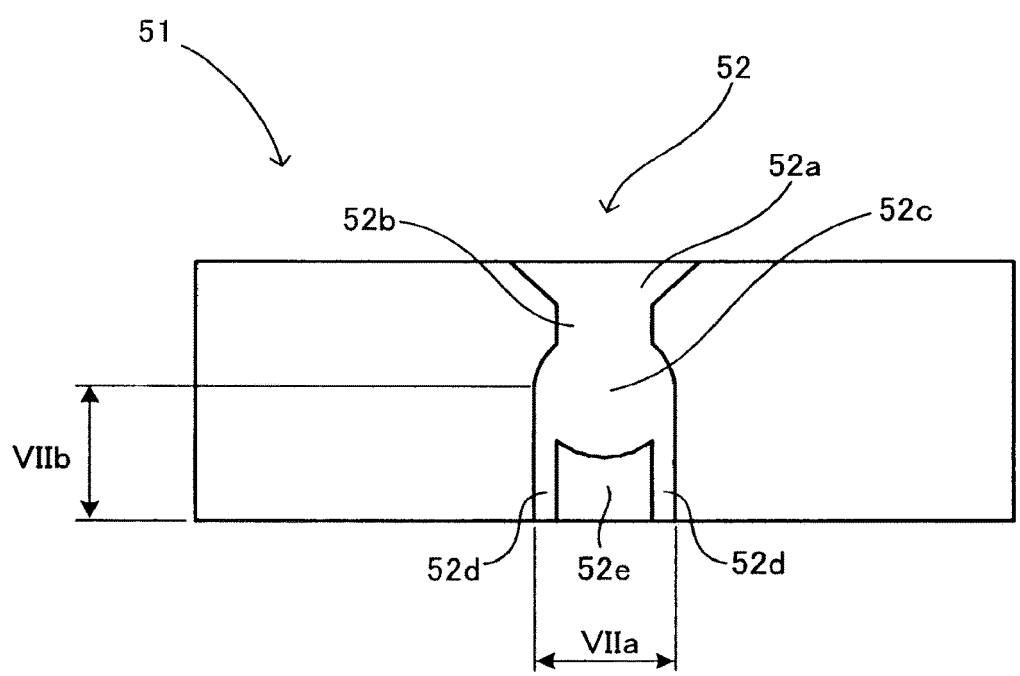
FIG. 7 is a view illustrating a holding projection 51 of a holding portion 50.

Each holding projection 51 of the embodiment includes a holding groove 52 which is open to the other holding projection 51 side which makes a pair, and extends in the direction along the axial direction of the tubular body 46. FIG. 7 is an enlarged view of a part of the holding projection 51 of FIG. 6B. As can be ascertained from FIG. 7, the holding groove 52 has a predetermined shape along the extending direction, and specifically, an introduction portion 52a, a communication portion 52b, a holding portion 52c, and a forming portion 52d are continuously arranged in the direction along the axis of the tubular body 46.

The introduction portion 52a is a part disposed on the side on which the intermediate member 60 is inserted in the holding groove 52, and a groove width (the size in the horizontal direction of a paper surface of FIG. 7, the size in the inner circumferential direction of the tubular body 46) becomes narrow toward the side opposite to the side on which the intermediate member 60 is disposed. The end portion on the side on which the intermediate member 60 is inserted in the introduction portion 52a is open, and as will be described later, it is possible to introduce a main body linking projection 61 (refer to FIG. 5) of the intermediate member 60 from here. In the embodiment, the introduction portion 52a is provided from the viewpoint of making it easy to insert the main body linking projection 61, but it is not necessary to provide the introduction portion 52a, and without providing the introduction portion 52a, the communication portion 52b which will be described later may be disposed in the end portion of the holding groove 52.

The communication portion 52b is a groove which is continuously provided from the end portion opposite to the side on which the intermediate member 60 is inserted in the introduction portion 52a, and is a groove which extends by the groove width that maintains the narrowed groove width in the introduction portion 52a. Accordingly, the communication portion 52b functions as a snap-fit jointing protrusion portion.

The holding portion 52c is a groove which is continuously provided from the end portion of the communication portion (snap-fit jointing protrusion portion) 52b, and is a groove of which the groove width is greater than that of the communication portion 52b. As will be described later, here, the main body linking projection 61 of the intermediate member 60 is held.

The forming portions 52d are two thin grooves which are continuously provided from the end portion of the holding portion 52c, and extend along the axial direction of the tubular body 46 from each of both end portions of the widest part in the groove width direction of the holding portion 52c. Therefore, a groove is not formed between the two forming portions 52d, and a material remains as a main body linking projection receiving portion 52e. Here, the size (width illustrated by VIIa in FIG. 7) between the outer sides of the two forming portions 52d is formed to become the same size as the widest width of the holding portion 52c. Therefore, here, there is not a reverse tapered part when viewed from the side of the forming portion 52d. In other words, at a part (section illustrated by VIIb in FIG. 7) at which the groove width becomes the widest in the holding portion 52c from the forming portion 52d, there is not a part of which the width is narrower than the width. Therefore, a shape which does not have an undercut is achieved in the injection molding. Accordingly, the disengagement is easy in the integrated molding, the mold can have a simple structure, and the productivity can be improved. An example of a specific manufacturing process will be described later.

According to the holding groove 52, the communication portion 52b of which the groove width is decreased between the introduction portion 52a and the holding portion 52c is formed, and this functions as a so-called snap-fit jointing protrusion portion. Therefore, when the main body linking projection 61 is disposed in the holding portion 52c, the snap-fit jointing is performed, and the main body linking projection 61 becomes unlikely to be removed from the holding groove 52.

In addition, as described above, a structure in which the productivity can be improved since the shape which is easily made by the integrated molding is employed, is also available.

In addition, since the main body linking projection 61 formed in a columnar shape is held by the holding portion 52c (refer to FIG. 5), it is preferable that at least a part of a surface which faces the holding portion 52c has an arc shape. Accordingly, smoother swing is promoted. However, the invention is not limited thereto.

A material which configures the main body 45 is not particularly limited, but a resin, such as polyacetal, polycarbonate, or PPS, or metal can be used. Here, in a case where the resin is used, in order to improve rigidity of the member, glass fibers, carbon fibers, or the like, may be mixed in the resin in accordance with a loading torque. In addition, in order to smoothly attach and move the shaft member, sliding properties may be improved by containing at least one of fluorine, polyethylene, and silicon rubber in the resin. In addition, the resin may be coated with fluorine, and may be coated with a lubricant.

In a case where the metal is used, it is possible to use scraping by cutting, aluminum die cast, zinc die cast, a metal powder injection molding method (so-called MIM method), or a metal powder sintering lamination method (so-called 3D print). In addition, regardless of the quality of material of metal, iron, stainless steel, aluminum, brass, copper, zinc, or an alloy of these materials, may be used. In addition, it is possible to improve functionality (lubricative properties or corrosion resistance) of the front surface by performing various types of soldering.

Figure 8A:
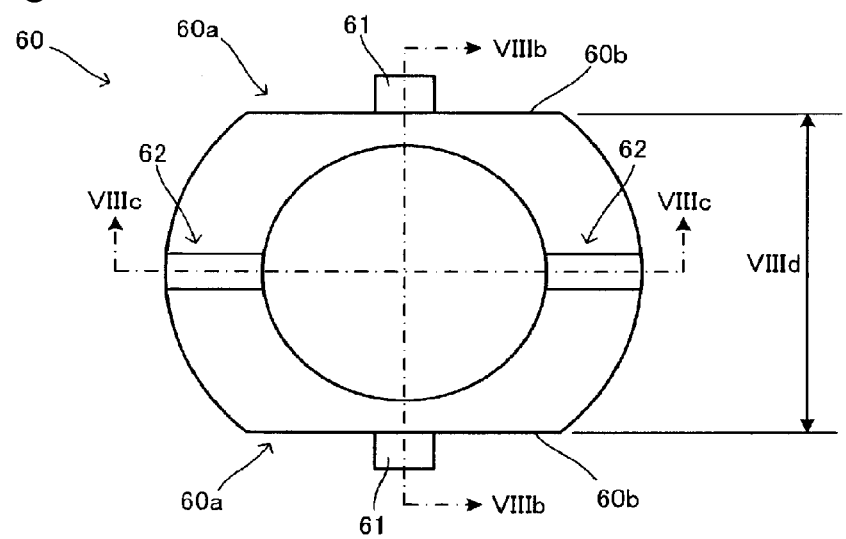
FIG. 8A is a plan view of an intermediate member 60.
Figure 8B:
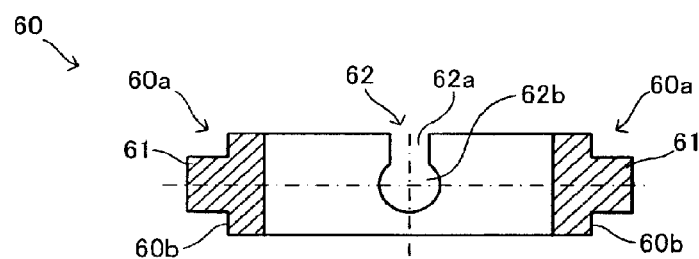
FIG. 8B is one sectional view of the intermediate member 60.
Figure 8C:
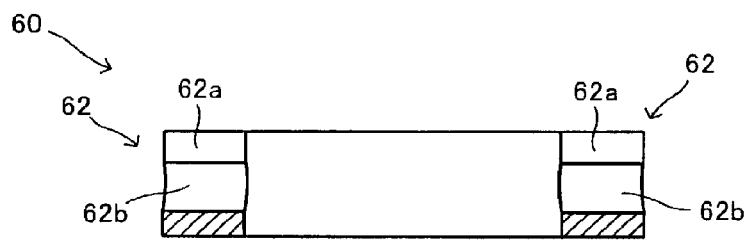
FIG. 8C is another sectional view of the intermediate member 60.

Returning to FIG. 4, the intermediate member 60 will be described. As can be ascertained from FIG. 4, the intermediate member 60 is an annular member as a whole. FIG. 8 illustrates the intermediate member 60. FIG. 8A is a plan view when the annular axis is viewed in the near/far direction of the paper surface, FIG. 8B is an arrow sectional view illustrated by VIIIb-VIIIb in FIG. 8A, and FIG. 8C is an arrow sectional view illustrated by VIIIc-VIIIc in FIG. 8A.

In the intermediate member 60, the annular inner diameter is greater than the diameter of a base end portion (spherical body 90 in the embodiment) of the shaft member 70 which will be described later. Accordingly, the swing of the shaft member 70 is appropriately performed by the intermediate member 60 without interference. In addition, the annular outer diameter of the intermediate member 60 is the size by which the intermediate member 60 does not come into contact with the inner side of the tubular body 46 even when the intermediate member 60 swings on the inner side of the tubular body 46.

In the intermediate member 60, one pair of cutout portions 60a which are cut out in parallel are included at a part of the outer diameter portion among the outer diameter portion and the inner diameter portion which form the annular shape, and two parallel planes 60b are formed. A distance (distance illustrated by VIIId in FIG. 8A) between two surfaces is formed to be smaller than the distance (distance illustrated by VId in FIG. 6A) between two holding projections 51.

In addition, the columnar main body linking projection 61 stands from each plane 60b. Here, in two main body linking projections 61, as can be ascertained from FIG. 8A, the axis of the column is disposed on one diameter of the ring nipping the axis of the intermediate member 60. Here, the columnar diameter of the main body linking projection 61 is slightly greater than the groove width of the communication portion 52b of the above-described holding groove 52, and additionally, is generally formed to be the same as the groove width of the holding portion 52c. However, from the viewpoint of adjusting the ease of the swing, for example, the diameter of the main body linking projection 61 can be smaller than the groove width of the holding portion 52c for smoother swing, and on the contrary, from the viewpoint of slightly regulating the degree of swing and making the movement light, the diameter of the main body linking projection 61 can be slightly greater than the groove width of the holding portion 52c.

In addition, in the intermediate member 60, two shaft member linking grooves 62 which extend in the direction in which the outer side and the inner side are linked to each other along the annular diameter, and considers the direction along the axis of the ring as the depth direction, are provided. As can be ascertained from FIG. 8A, the two shaft member linking grooves 62 consider the extending direction as the diameter direction of the ring of the intermediate member 60, and the two shaft member linking grooves 62 are disposed on one diameter nipping the axis of the intermediate member 60. In addition, the shaft member linking groove 62 and the above-described main body linking projection 61 are disposed at a position shifted by 90 degrees around the axis of the intermediate member 60.

In FIG. 8B, the shape of the shaft member linking groove 62 in the direction orthogonal to the direction in which the shaft member linking groove 62 extends, is illustrated. As can be ascertained from the drawing, in the shaft member linking groove 62, a communication position 62a is disposed on the opening side (upper side of FIG. 8B), and a holding portion 62b is formed on a far side continuously from the communication position 62a. Here, since a rotating force transmission projection 95 of the shaft member 70 is held, the holding portion 62b is formed to have a circular section in accordance with the sectional shape of the rotating force transmission projection 95. Here, as can be ascertained from FIG. 8B, in the thickness direction of the intermediate member 60, the center position of the holding portion 62b is disposed to match the axis position of the main body linking projection 61. Accordingly, the shaft member 70 can swing equivalently across the entire direction. In addition, by the equivalent swing, regardless of the phase of the photoreceptor drum, the attachment and detachment of the process cartridge become smooth.

In addition, in the embodiment, an example in which the shaft member linking groove 62 is formed of the communication position 62a and the holding portion 62b, is illustrated. Not being limited thereto, on the side opposite to the end portion which communicates with the holding portion 62b in the communication position 62a, an introduction portion which is formed so that the groove width is gradually widened along an introduction portion 51a of the above-described holding groove 52, may be provided.

In addition, a part which is the largest in the groove width (in the horizontal direction of the paper surface of FIG. 8B) of the holding portion 62b is formed to be greater than the groove width of the communication position 62a. This functions as a so-called snap-fit jointing projection. Therefore, when the rotating force transmission projection 95 of the shaft member 70 is disposed in the holding portion 62b, the snap-fit jointing is performed, and the rotating force transmission projection 95 is unlikely to be removed from the shaft member linking groove 62.

A material which configures the intermediate member 60 is not particularly limited, but a material similar to that of the main body 45 can be used.

Figure 9A:
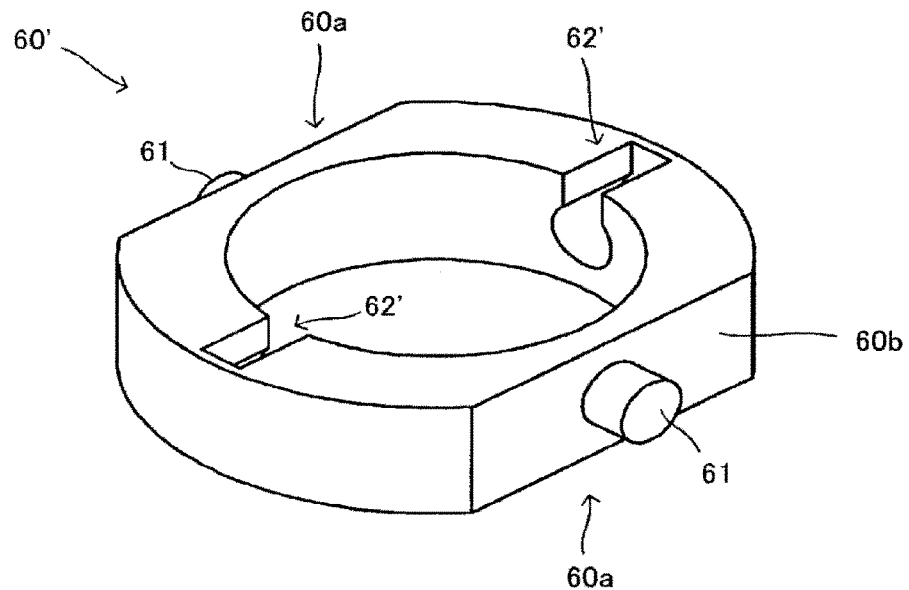
FIG. 9A is a perspective view of an intermediate member 60'.
Figure 9B:
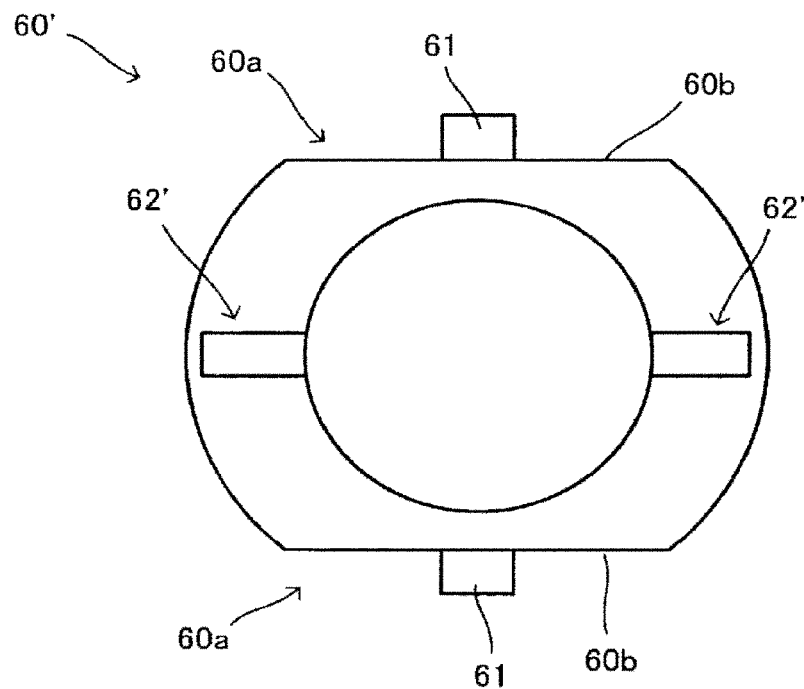
FIG. 9B is a plan view of the intermediate member 60'.

In FIG. 9, an embodiment of an intermediate member 60' according to a modification example is illustrated. FIG. 9A is a perspective view of the intermediate member 60', and FIG. 9B is a plan view of the intermediate member 60'. In the intermediate member 60', an outer side of the ring of the intermediate member 60' is blocked by a wall in the direction in which a shaft member linking groove 62' extends, and does not communicate with the outer side. According to this, in the rotating force transmission projection 95 (refer to FIG. 4) of the shaft member 70 which is inserted into the shaft member linking groove 62', the movement in the direction in which the shaft member linking groove 62' extends is regulated, and more stable swing is possible.

Figure 10A:
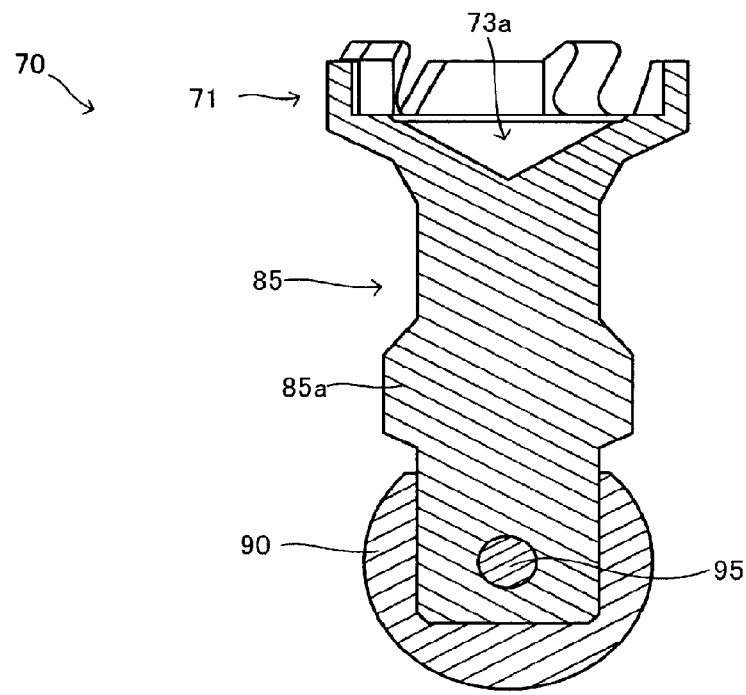
FIG. 10A is one sectional view of a shaft member 70.
Figure 10B:
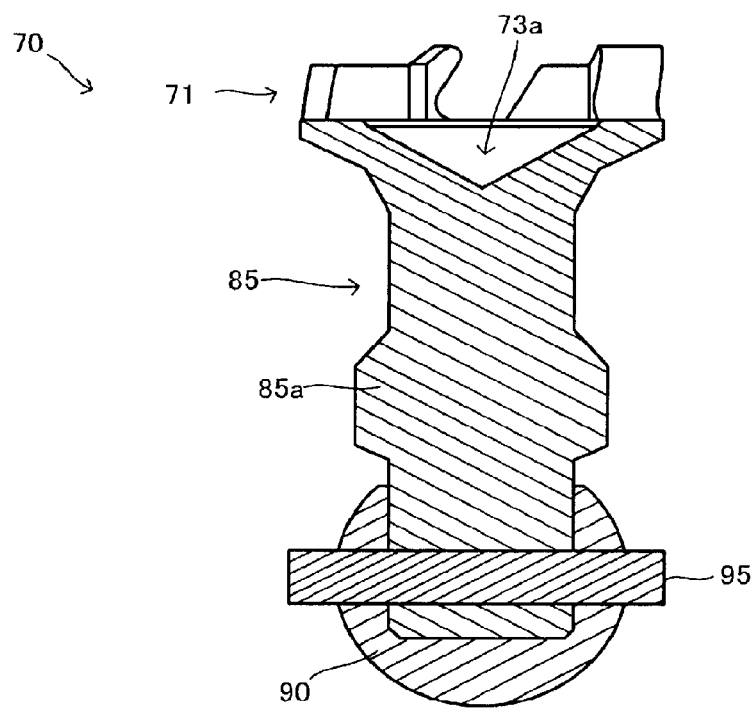
FIG. 10B is another sectional view of the shaft member 70.

Returning to FIG. 4, the shaft member 70 in the end member 40 will be described. FIG. 10A illustrates a sectional view along line Xa-Xa of the shaft member 70 illustrated in FIG. 3B, and FIG. 10B illustrates a sectional view along line Xb-Xb of the shaft member 70 illustrated in FIG. 3B, respectively. Two sections are sections shifted by 90 degrees around the axis. As can be ascertained from FIGS. 4, 10A, and 10B, the shaft member 70 is provided with a coupling member 71, a rotating shaft 85, the spherical body (base end portion) 90, and the rotating force transmission projection 95.

Figure 11:
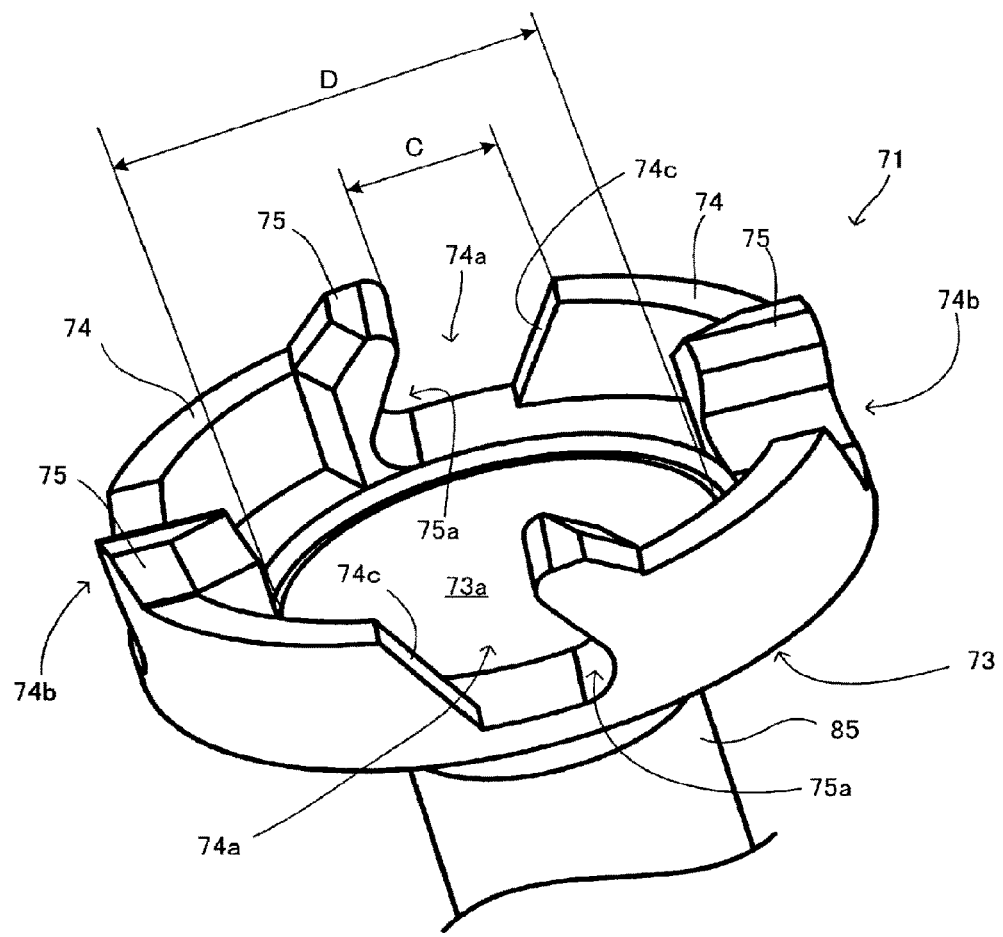
FIG. 11 is an enlarged view of a coupling member 71.

The coupling member 71 is a part which functions as a rotating force receiving portion that receives the rotation driving force from the apparatus main body 2 (refer to FIG. 1). FIG. 11 is an enlarged view of the coupling member 71. As can be ascertained from FIGS. 4, 10A, 10B, and 11, the coupling member 71 has a bottom portion 73 which is a member having a shape of a circular tray and is provided with a conical recessed portion 73a so that a part through which the axis passes on the inner side is the deepest side.

In addition, on the surface of the bottom portion 73, a tubular engaging wall 74 stands along an edge of the surface on one surface side (a side opposite to the side on which the rotating shaft 85 is provided). Two pairs of grooves 74a and 74b provided to oppose each other nipping the axis of the shaft member 70 are provided on the engaging wall 74. One pair of grooves 74a and the other pair of grooves 74b are shifted by 90 degrees around the center.

In each of the grooves 74a and 74b, as well illustrated in FIG. 11, a projected portion 75 is provided on one side wall of the groove, and a recess 75a is provided in the circumferential direction on the bottom portion 73 side. Accordingly, as will be described later, a pin 8b of the driving shaft 8 of the apparatus main body 2 is engaged with the recess 75a, and is prevented from being removed, and the rotating force is appropriately transmitted (refer to FIG. 14B).

In addition, an inclined surface 74c is formed on the side wall on the other side of each of the grooves 74a and 74b, and the introduction into the groove of the above-described pin 8b is easily performed.

Therefore, the width of the groove 74a illustrated by C in FIG. 11 is slightly greater than the diameter of the pin 8b (refer to FIG. 14B), and is narrower than the diameter of the shaft portion 8a so that the shaft portion 8a of the driving shaft 8 cannot pass therethrough. In addition, the diameter on the inner side of the engaging wall 74 illustrated by D in FIG. 11 is formed to be slightly greater than the diameter of the shaft portion 8a of the driving shaft 8, but are approximately the same in general. How to be capable of receiving the rotating force from the driving shaft 8 will be described later.

In the embodiment, four (two pairs) of grooves of the engaging wall are employed, but the number of the grooves are not particularly limited, and may be two (one pairs), six (three pairs) or more. In addition, here, an embodiment of the coupling member 71 is illustrated as a specific example, but the coupling member 71 is not necessarily limited thereto, and a shape in which the driving shaft 8 can be engaged to and disengaged from the apparatus main body 2 may be employed.

The rotating shaft 85 is a columnar shaft-like member which functions as a rotating force transmission portion that transmits the rotating force received by the coupling member 71. Therefore, the above-described coupling member 71 is disposed at one end of the rotating shaft 85. In addition, in the embodiment, the diameter of the rotating shaft 85 is configured to have a diameter expansion portion 85a in which a part is formed to be large. The diameter expansion portion 85a and the other part are continuously connected to each other on the surface which is inclined in a tapered shape.

The spherical body 90 functions as a base end portion, and in the embodiment, as can be ascertained from FIGS. 10A and 10B, the spherical body 90 is a spherical member, and is provided in the end portion opposite to the side on which the coupling member 71 is disposed among the end portions of the rotating shaft 85. At this time, it is preferable that the axis of the rotating shaft 85 and the center of the spherical body 90 match each other as much as possible. Accordingly, it is possible to obtain more stable swing of the photoreceptor drum 20. In addition, the diameter of the spherical body 90 is the size by which the above-described bearing member 41 is accommodated in the inner side of the ring of the intermediate member 60, and preferably, the diameter of the spherical body 90 is smaller than the inner diameter of the ring.

In the embodiment, a case where a spherical shape is used as the base end portion is illustrated, but the invention is not limited thereto. The embodiment is not particularly limited as long as an embodiment in which the swing of the shaft member 70 is not interfered with as will be described later, such as a case of a partial spherical shape, or a case where oval-shaped curved surfaces are combined, is employed.

The rotating force transmission projection 95 is a columnar shaft-like member which forms the projection-like rotating force transmission projection that protrudes from the base end portion at an opposite position nipping the axis of the base end portion, passes through the center of the spherical body 90 in the embodiment, and forms a rotation transmission projection as both ends protrude from the spherical body 90 through the spherical body 90. The axis of the rotating force transmission projection 95 is provided to be orthogonal to the axis of the above-described rotating shaft 85.

A material which configures the shaft member 70 is not particularly limited, but a resin, such as polyacetal, polycarbonate, or PPS, or metal can be used. Here, in a case where the resin is used, in order to improve rigidity of the member, glass fibers, carbon fibers, or the like, may be mixed in the resin in accordance with a loading torque. In addition, in order to smoothly attach and move the shaft member, sliding properties may be improved by containing at least one of fluorine, polyethylene, and silicon rubber in the resin. In addition, the resin may be coated with fluorine, and may be coated with a lubricant.

In a case where the metal is used, it is possible to use scraping by cutting, aluminum die cast, zinc die cast, a metal powder injection molding method (so-called MIM method), or a metal powder sintering lamination method (so-called 3D print). In addition, regardless of the quality of material of metal, iron, stainless steel, aluminum, brass, copper, zinc, or an alloy of these materials, may be used. In addition, it is possible to improve functionality (lubricative properties or corrosion resistance) of the front surface by performing various types of plating.

Figure 12:
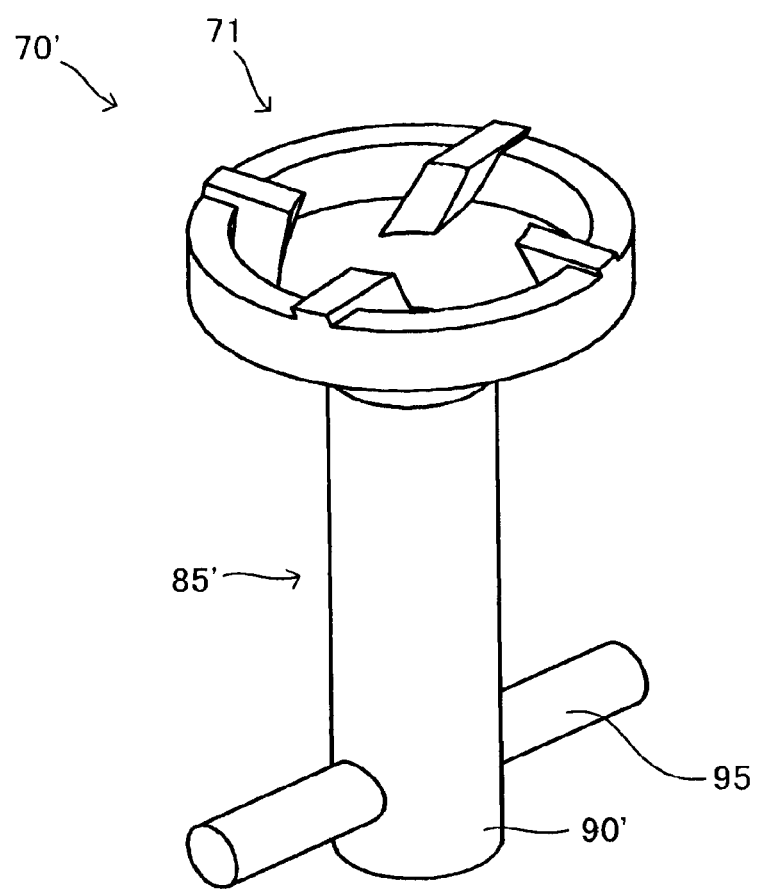
FIG. 12 is a perspective view of a shaft member 70'.

FIG. 12 illustrates a perspective view of a shaft member 70' according to a modification example. The shaft member 70' has a columnar shape which does not have the diameter expansion portion in a rotating shaft 85', a base end portion 90' is continuously connected to the rotating shaft 85' in the same shape, and the rotating shaft 85' and the base end portion 90' are formed of one column. The shaft member 70' also acts similar to the above-described shaft member 70.

Figure 13A:
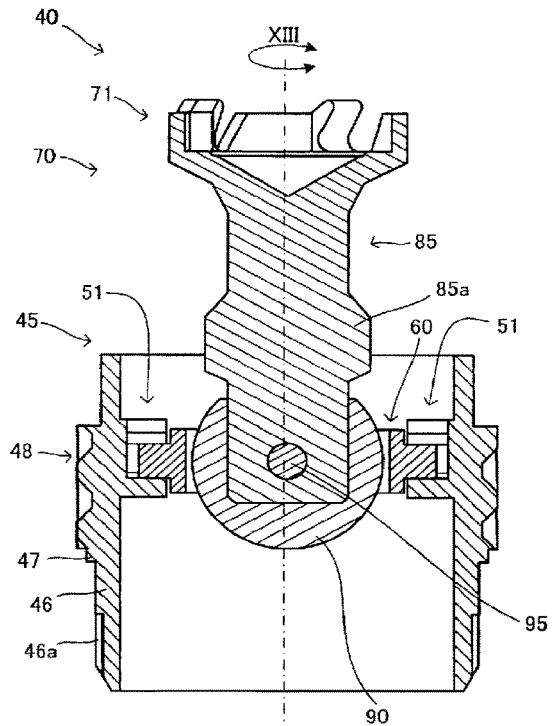
FIG. 13A is one sectional view of the end member 40.
Figure 13B:
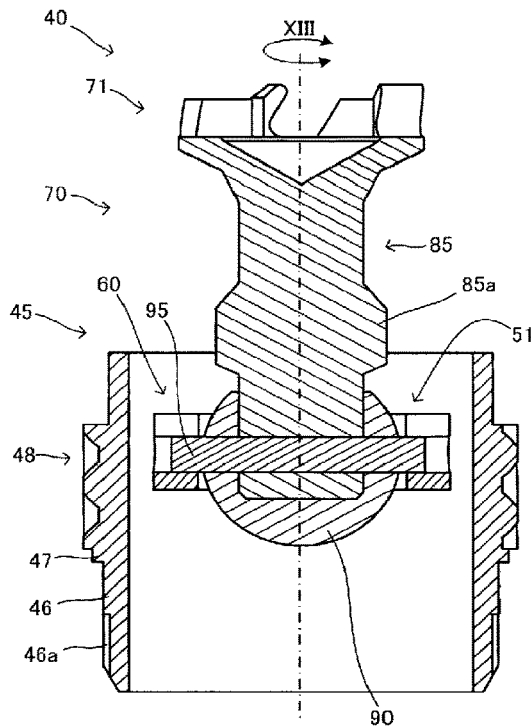
FIG. 13B is another sectional view of the end member 40.
Figure 14A:
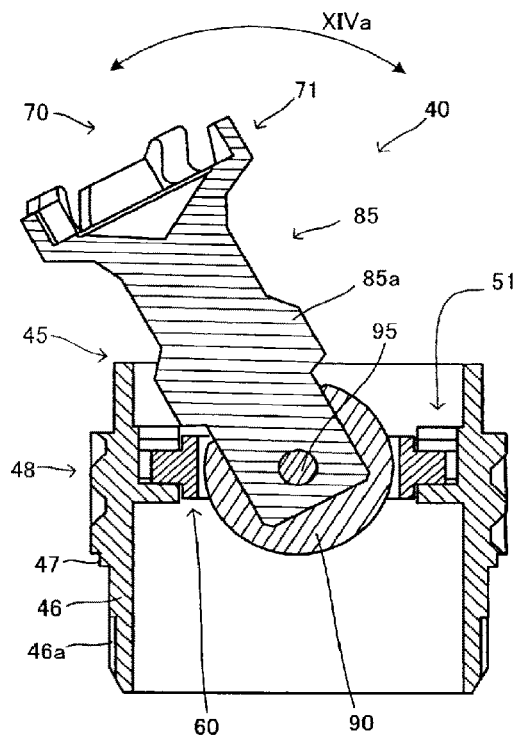
FIG. 14A is one sectional view of the end member 40 illustrating an example of a posture in which the shaft member 70 is inclined.
Figure 14B:
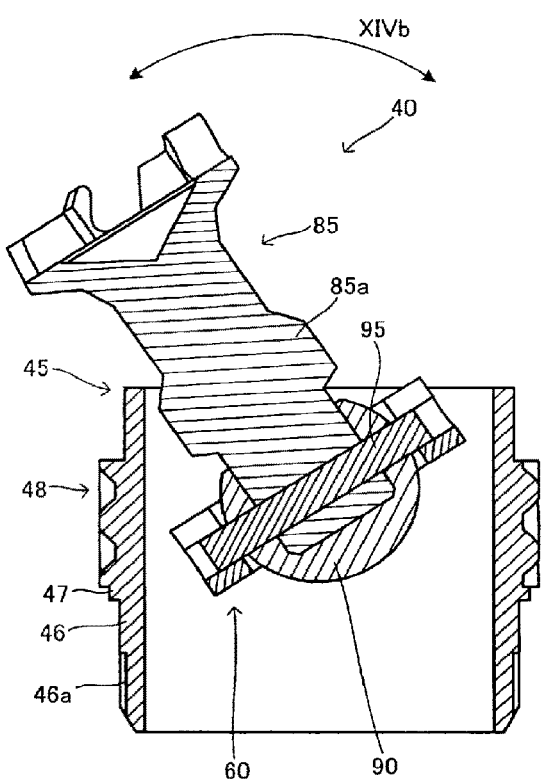
FIG. 14B is another sectional view of the end member 40 illustrating an example of a posture in which the shaft member 70 is inclined.

The above-described bearing member 41 and the shaft member 70 are combined with each other as follows, and becomes the end member 40. By the description of the combination, an embodiment in which the bearing member 41 and the shaft member 70 are provided, and a relationship of the size and a positional relationship between the members, are further understood. FIG. 13A illustrates a sectional view of the end member 40 along line Xa-Xa illustrated in FIG. 3B, and FIG. 13B illustrates a sectional view of the end member 40 along line Xb-Xb illustrated in FIG. 3B, respectively. In addition, FIG. 14A illustrates an example of a posture in which the shaft member 70 is inclined from the viewpoint illustrated in FIG. 13A, and FIG. 14B illustrates an example of a posture in which the shaft member 70 is inclined from the viewpoint illustrated in FIG. 13B.

As can be particularly well ascertained from FIGS. 13A and 13B, the spherical body 90 is disposed on the inner side of the ring of the intermediate member 60, and the rotating force transmission projection 95 is inserted into the shaft member linking groove 62 of the intermediate member 60. Accordingly, the intermediate member 60 and the shaft member 70 are combined with each other. When combining the members, each protruding end portions of the rotating force transmission projection 95 passes through the communication position 62a to be pushed from the opening portion of the shaft member linking groove 62, is disposed in the holding portion 62b, and is combined by snap-fit jointing. In addition, the shaft member 70 can swing with respect to the intermediate member 60 around the axis of the rotating force transmission projection 95 as illustrated by an arrow XIVa in FIG. 14A.

Meanwhile, as can be particularly well ascertained from FIGS. 13A and 13B, the intermediate member 60 with which the shaft member 70 is combined is disposed between two holding projections 51 disposed on the inner side of the tubular body 46. At this time, the main body linking projection 61 of the intermediate member 60 is inserted into the holding groove 52 formed in the holding projection 51 of the tubular body 46. Accordingly, the intermediate member 60 and the main body 45 are combined with each other, and as a result, the main body 45, the intermediate member 60, and the shaft member 70 are combined with each other coaxially. When combining the members, each main body linking projection 61 of the intermediate member 60 passes through the communication portion 52b to be pushed from the introduction portion 52a of the holding groove 52 provided in the holding projection 51 of the tubular body 46, is disposed in the holding portion 52c, and is combined by snap-fit jointing. In addition, as illustrated by an arrow XIVb in FIG. 14B, the shaft member 70 can swing in each intermediate member 60 around the axis of the main body linking projection 61 of the intermediate member 60.

In this manner, in the end member 40 of the embodiment, the intermediate member 60 is held by the main body 45 by the snap-fit jointing not to be removed, and the shaft member 70 is held by the intermediate member 60 by the snap-fit jointing not to be removed. Therefore, the shaft member 70 is not directly held by the main body 45.

In addition, the end member 40 can be assembled by disposing the shaft member 70 in the intermediate member 60 first, and by attaching this to the main body 45. In addition, any of these is linked to each other by the snap-fit jointing. Therefore, it is possible to easily assemble the shaft member 70 to the bearing member 41 with high productivity. In addition, since not only the assembly but also the disengagement is similarly easy, the reuse is also easily performed. In particular, since it is not necessary to deform the shaft member 70 when inserting and disengaging the shaft member 70, a concern about damage or the like is solved. In addition, since the disengagement is easy, workability can also be improved.

Furthermore, according to the intermediate member 60, the rotating force transmission projection (rotating force transmission pin) is provided, and even when the spherical body is provided in the base end portion, the rotating force transmission projection can be combined with the bearing member 41. Therefore, it is possible to use the type of the shaft portion which is well viewed during the reusing.

In this manner, as the shaft member 70 is disposed on the inner side of the bearing member 41, the shaft member 70 can swing as illustrated in FIGS. 14A and 14B. In other words, in the viewpoint illustrated in FIG. 14A, as illustrated by an arrow XIVa, the shaft member 70 can swing around the axis of the rotating force transmission projection 95. Meanwhile, as illustrated by an arrow XIVb in the viewpoint illustrated by FIG. 14B, the shaft member 70 can swing following the swing around the main body linking projection 61 of the intermediate member 60 itself. The swing illustrated in FIG. 14A and the swing illustrated in FIG. 14B are swing in the direction orthogonal to each other.

At this time, as can be ascertained from FIG. 8B, in the thickness direction of the intermediate member 60, since the center position of the holding portion 62b is disposed to match the axial direction of the main body linking projection 61, two shafts of swing are on the same plane, and the swing can be equivalently performed across the entire orientation. In addition, regardless of the phase of the photoreceptor drum by the equivalent swing, the process cartridge is smoothly attached and detached.

In addition, when the driving force from the apparatus main body 2 is received, the shaft member 70 receives the rotating force around the axis as illustrated by an arrow XIII in FIGS. 13A and 13B. At this time, both end portions of the rotating force transmission projection 95 of the shaft member 70 pressurizes the intermediate member 60, the main body linking projection 61 of the intermediate member 60 is hooked to the side wall of the holding groove 52 of the main body 45, and the rotating force can be transmitted to the photoreceptor drum 20.

In this manner, according to the end member 40, since the swing in at least one direction of the shaft member 70 is the swing between the intermediate member 60 and the main body 45, the operation is smooth. At this time, since the swing has nothing to do with the embodiment of the shaft member, it is possible to ensure sufficiently smooth swing even when there is slight unevenness or the like in dimensions on the shaft member side. In addition, even when the angle of the swing is large, there is not a concern that the shaft member 70 is removed, and thus, it is possible to increase the angle of the swing. Accordingly, since it is possible to reduce gap between the photoreceptor drum (process cartridge) and the rotating force transmission shaft on the apparatus main body side, it is possible to reduce the size of the apparatus main body.

In addition, according to the end member 40, there is not a necessity to provide a groove (introduction groove) for introducing the rotating force transmission pin described in NPL 1 into the swing groove, and it is possible to solve the problem that the shaft member is unintentionally removed during the swing.

By the structure described above, the shaft member 70 rotates (swings) and is held by the bearing member 41 while transmitting the rotating force.

The end member 40 is attached to the photoreceptor drum 20 as the end portion on the side on which the shaft member 70 does not protrude in the end member 40 is inserted into the photoreceptor drum 20 after the assembly of the end member 40 as illustrated in FIGS. 13A and 13B. The rotating force is appropriately imparted to the photoreceptor drum 20 when mounting the process cartridge 3 on the apparatus main body 2 by the end member 40, and it is possible to easily attach and detach the process cartridge 3.

Returning to FIG. 1, the process cartridge 3 will be continuously described. As described above, the charging roller unit 4, the developing roller unit 5, the regulating member 6, and the cleaning blade 7 which are provided on the inner side of the housing 3a of the process cartridge 3 are as follows.

Each of the above-described members are accommodated to be rotatable on the inner side of the housing 3a. In other words, each member rotates in accordance with the necessity on the inner side of the housing 3a, and achieves the functions.

Here, in the shaft member 70 of the above-described photoreceptor drum 20, at least the coupling member 71 is disposed to be exposed from the housing 3a. Accordingly, as will be described later, the rotation driving force can be obtained from the apparatus main body 2, and the apparatus main body 2 and the process cartridge 3 are easily attached to and detached from each other.

Here, each member and the blade which are provided in the process cartridge 3 is described, but the members provided here are not limited thereto, and it is preferable that members, parts, and developer which are generally provided in other process cartridges, are provided.

Next, the apparatus main body 2 will be described. The apparatus main body 2 of the embodiment is a laser printer. In the laser printer, when the above-described process cartridge 3 operates in a posture of being mounted and an image is formed, the photoreceptor drum 20 rotates, and charging is performed by the charging roller unit. In this state, the photoreceptor drum 20 is irradiated with the laser light that corresponds to the image information by using various optical members provided here, and the electrostatic latent image based on the image information is obtained. The latent image is developed by the developing roller unit.

Meanwhile, the recording medium, such as a paper sheet, is set in the apparatus main body 2, and is transported to a transfer position by a sending drum and a transporting roller which are provided in the apparatus main body 2. A transfer roller 1a is disposed at the transfer position, the voltage is applied to the transfer roller 1a in accordance with the passage of the recording medium, and the image is transferred to the recording medium from the photoreceptor drum 20. After this, as the heat and the pressure are applied to the recording medium, the image is fixed to the recording medium. In addition, the recording medium on which the image is formed is discharged from the apparatus main body 2 by the discharge roller or the like.

In this manner, in a posture in which the process cartridge 3 is mounted, the apparatus main body 2 imparts the rotation driving force to the photoreceptor drum unit 10. In addition, in a posture in which the process cartridge 3 is mounted, how to impart the rotation driving force to the photoreceptor drum unit 10 from the apparatus main body 2 will be described.

Figure 15A:
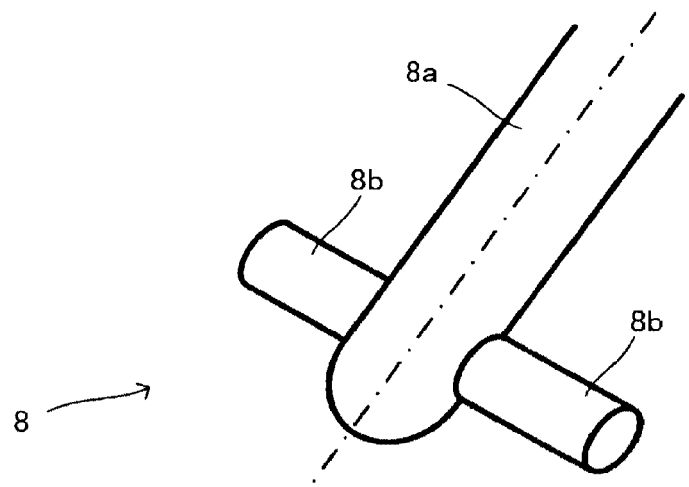
FIG. 15A is a perspective view illustrating a tip end portion of a driving shaft 8 of the image forming apparatus main body.

The rotation driving force to the process cartridge 3 is imparted by the driving shaft 8 which serves as a rotating force imparting portion of the apparatus main body 2. FIG. 15A illustrates a shape of a tip end portion of the driving shaft 8. As can be ascertained from FIG. 15A, the driving shaft 8 has the columnar shaft portion 8a in which the tip end is a semispherical surface, and the columnar pin 8b which serves as the rotating force imparting portion that protrudes in the direction orthogonal to the axis illustrated by a one-dot chain line of the shaft portion 8a is provided. In the driving shaft 8, on the side opposite to the tip end side illustrated in FIG. 15A, a gear row is formed to be capable of rotating the driving shaft 8 around the axis, and is connected to a motor which is a driving source via this.

In addition, the driving shaft 8 is disposed to protrude on a track of the attaching and detaching movement to be substantially perpendicular to the moving direction for attaching and detaching the process cartridge 3 illustrated in FIG. 1 to and from the apparatus main body 2. Therefore, in attaching and detaching the process cartridge 3, it is necessary to mount and disengage the shaft member 70 to and from the driving shaft 8. In addition, according to the above-described end member 40, the shaft member 70 and the driving shaft 8 are easily attached to and detached from each other. Specific attachment and detachment aspect will be described later in detail.

Figure 15B:
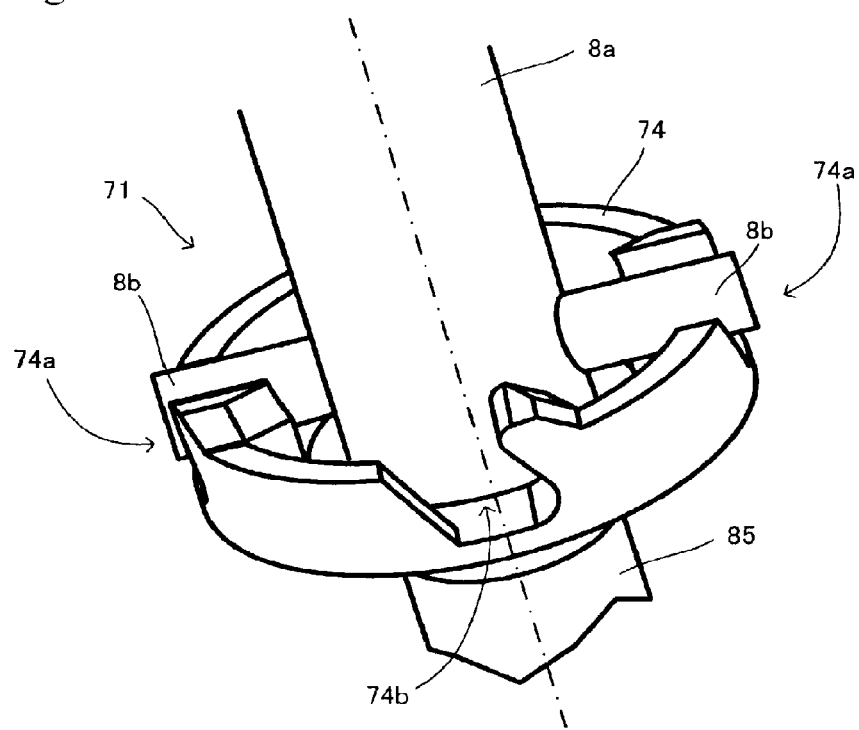
FIG. 15B is a view illustrating a posture in which a pin 8b of the driving shaft 8 is linked to the coupling member 71.

In a posture in which the process cartridge 3 is mounted on the apparatus main body 2, the driving shaft 8 and the coupling member 71 of the shaft member 70 of the end member 40 are engaged with each other, and the rotating force is transmitted. FIG. 15B illustrates a situation in which the coupling member 71 of the end member 40 is engaged with the driving shaft 8. As can be ascertained from FIG. 15B, in a posture in which the driving shaft 8 and the coupling member 71 are engaged with each other, the axis of the shaft portion 8a of the driving shaft 8 and the axis of the coupling member 71 are disposed to face to match each other. At this time, the pin 8b of the driving shaft 8 is disposed on the inner side of the opposing groove 74a of the coupling member 71 or the groove 74b (in FIG. 15B, the pin 8b is disposed on the inner side of the groove 74a). Accordingly, the coupling member 71 rotates following the rotation of the driving shaft 8, and the photoreceptor drum unit 10 rotates.

Above, the posture in which the rotating force is transmitted, is a posture in which the axis of the driving shaft 8 and the axis of the coupling member 71 are disposed coaxially, and the pin 8b is on the inner side of the groove 74a or the groove 74b of the coupling member 71.

Figure 16A:
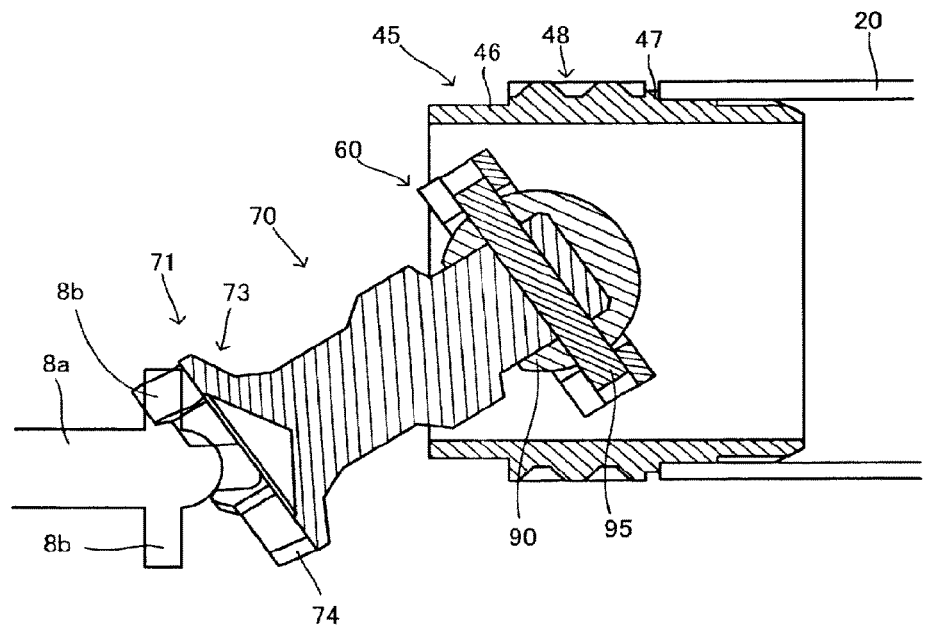
FIG. 16A is a view illustrating an example of one situation in which the process cartridge is mounted on the apparatus main body.
Figure 16B:
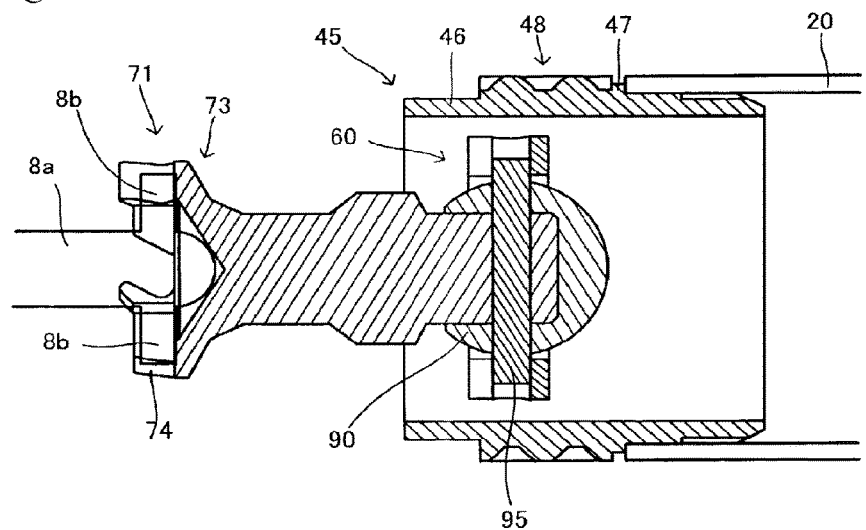
FIG. 16B is a view illustrating an example of another situation in which the process cartridge is mounted on the apparatus main body.

Next, an example of an operation of the driving shaft 8 when mounting the process cartridge 3 on the apparatus main body 2 and the photoreceptor drum unit 10, will be described. FIG. 16 illustrates a view of the description. FIG. 16A is a view illustrating one situation in which the end member 40 is engaged with the driving shaft 8, and FIG. 16B is a view of another situation in which the end member 40 is engaged with the driving shaft 8. In FIG. 16, in FIGS. 16A and 16B, an order of the operations is illustrated, and the left and right orientation of the paper surface is the orientation which becomes the axial direction. In addition, this is a situation in which the process cartridge 3 is mounted after being moved downward on the paper surface.

First, as illustrated in FIG. 16A, the coupling member 71 of the shaft member 70 is in a posture of being inclined to the driving shaft 8 side. It is preferable that the posture is a posture in which the shaft member 70 is inclined the most. When the process cartridge 3 is moved downward of the paper surface from the posture, the tip end of the driving shaft 8 comes into contact with the inner side of the bottom portion 73 of the coupling member 71 or the engaging wall 74 being hooked thereto. When further pushing the process cartridge 3 into the apparatus main body 2, the driving shaft 8 which comes into contact with the coupling member 71 being hooked thereto rotates (swings) to approach the shaft member 70 that is inclined with respect to the axial direction in the axial direction. In addition, the pin 8b is inserted into the inner side of the groove 74a.

In addition, by pushing the process cartridge 3 in the mounting direction, as illustrated in FIG. 16B, a posture in which the axis of the inclined shaft member 70 matches the axis of the driving shaft 8, and matches the axis of the driving shaft 8, the shaft member 70, the bearing member 41, and the photoreceptor drum 20, illustrated in FIG. 16B, is achieved. Accordingly, the rotating force is appropriately imparted to the shaft member 70, the bearing member 41, and the photoreceptor drum 20 from the driving shaft 8, and the rotating force is imparted into the process cartridge 3 finally.

Meanwhile, the operations of the driving shaft 8 when disengaging the process cartridge 3 from the apparatus main body 2 and the photoreceptor drum unit 10, may be backward to the above-described order.

As described above, it is possible to disengage the process cartridge 3 from the apparatus main body 2 to be pulled out in the direction different from the axial direction of the driving shaft 8 of the apparatus main body 2, and to mount the process cartridge 3 on the apparatus main body 2 by pushing the process cartridge 3.

Next, an example of manufacturing the main body 45 of the bearing member 41 in the end member 40, will be described. Since the manufacturing method in the related art can be employed at a part except for the main body 45, here, the description thereof will be omitted.

The main body 45 is formed by the injection molding. In other words, the main body 45 is formed by combining a plurality of molds, by performing the hardening by injection filling or the like a material to a cavity portion of the combined mold, and by disengaging the mold. Therefore, in molding the main body 45, a mold for forming a shape on the outer circumferential side and on the inner side of the tubular body 46, becomes necessary. In molding the main body 45, since the forming of the shape on the inner side of the main body 45 is characteristic, here, the molding on the inner side will be described. In addition, the shape (for example, gear 48) on the outer circumferential side of the main body 45 can be molded similar to the related art.

Figure 17:
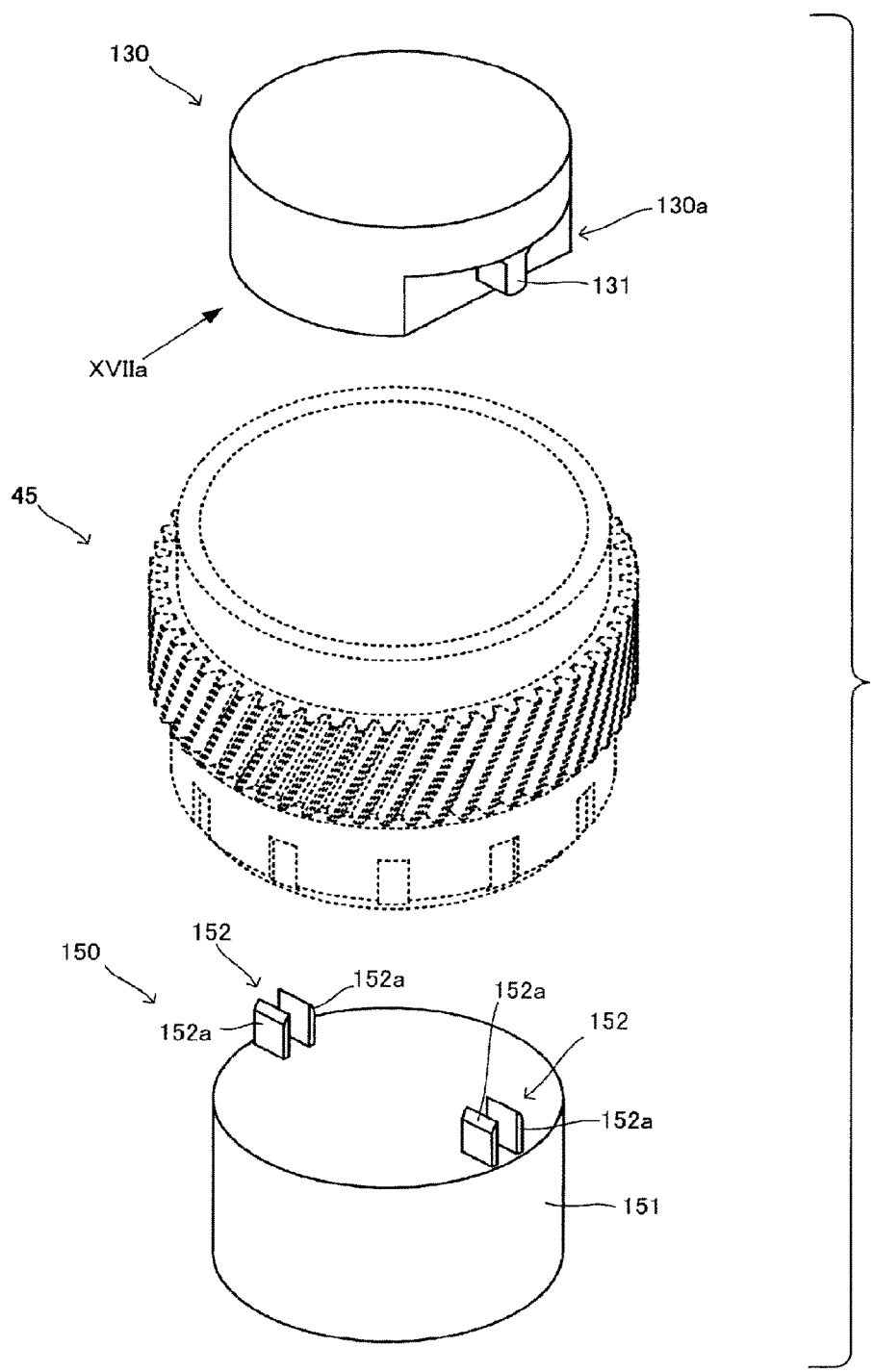
FIG. 17 is a perspective view illustrating a first mold 130 and a second mold 150.

FIG. 17 illustrates a perspective view of the first mold 130 and the second mold 150 which mold the shape on the inner side of the main body 45. FIG. 17 is a perspective view (the main body 45 is illustrated by a dashed line) including the disposition of the molded main body 45, the first mold 130, and the second mold 150.

As can be ascertained from FIG. 17, in the example, the shape on the inner side of the main body 45 is molded by two molds.

The first mold 130 is provided with a cut 130a having an L shape in a front view (viewpoint viewed from the direction illustrated by an arrow XVIIa in FIG. 17) having a surface orthogonal to the axial direction of the column and the axial direction at a columnar part. In addition, the protrusion portion 131 is disposed to be suspended from the surface orthogonal to the axis of the column in the cut 130a. The protrusion portion 131 can form a part of the introduction portion 52a and the communication portion 52b, in the holding groove 52 provided in the holding projection 51 of the main body 45.

In addition to the cut 130a and the protrusion portion 131 illustrated in FIG. 17, the cut 130a and the protrusion portion 131 are also similarly provided on the opposite side nipping the axis of the column (in FIG. 17, the members are not seed due to a dead angle).

Meanwhile, the second mold 150 is provided with two groups of standing plates (protrusion portion) 152 which stand from a column 151 and one surface of the column 151 and function as the protrusion portion.

The standing plate 152 is disposed so that the plate surfaces of two plates 152a which stand from one surface of the column 151 oppose each other at a predetermined interval. Accordingly, in the holding groove 52 provided in the holding projection 51 of the main body 45, it is possible to form a part of the holding portion 52c and the forming portion 52d. One more pair of the standing plates 152 is disposed on the opposite side nipping the axis of the column 151.

Here, any of the protrusion portion 131 of the first mold 130 and the protrusion portion (standing plate 152) of the second mold 150 is formed of a shape which does not have an undercut in injection molding.

By performing the injection molding by combining the first mold 130, the second mold 150, and other molds which is not illustrated, it is possible to integrally form the main body 45 including the holding portion 50. In addition, after the molding, it is possible to appropriately release the first mold 130 and the second mold 150.

Figure 18:
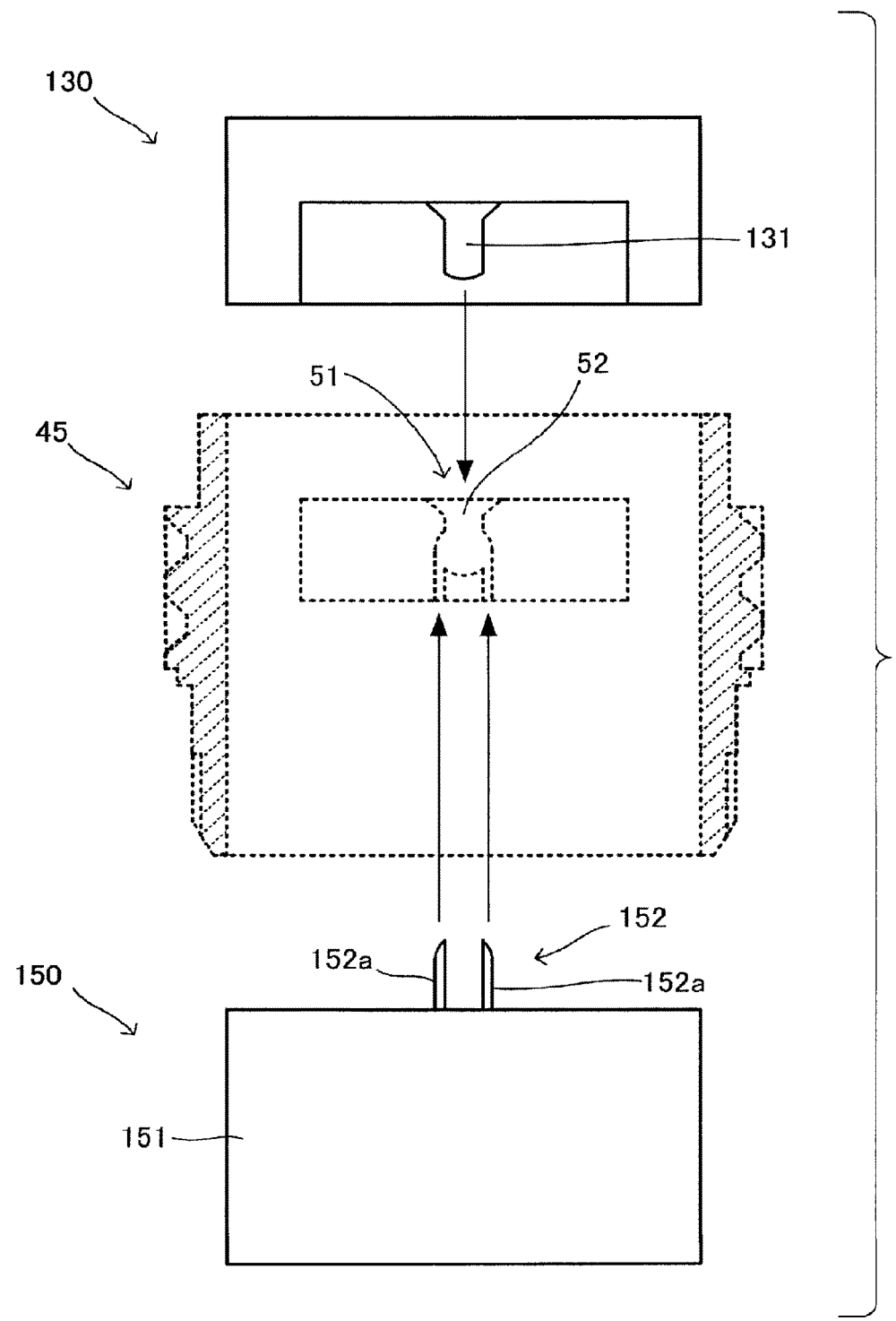
FIG. 18 is a view illustrating a combining process of the first mold 130 and the second mold 150.
Figure 19A:
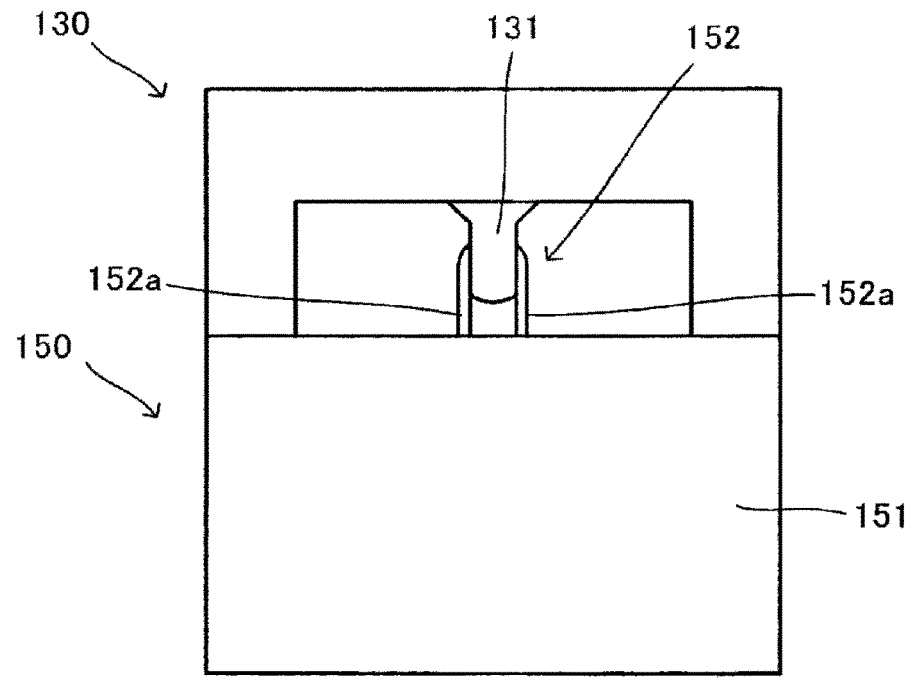
FIG. 19A is a view illustrating the first mold 130 and the second mold 150 being combined with each other.

Next, a shape which can be formed by the combination of the first mold 130 and the second mold 150, will be described. FIG. 18 illustrates a situation in which the first mold 130 and the second mold 150 are combined with each other. FIG. 18 illustrates a section of the main body 45 by a dashed line for the reference. FIG. 19A is a view in which the first mold 130 and the second mold 150 are combined with each other, and FIG. 19B illustrates an enlarged view of a part at which the protrusion portion 131 and the standing plate 152 are combined with each other in FIG. 19A, respectively.

Figure 19B:
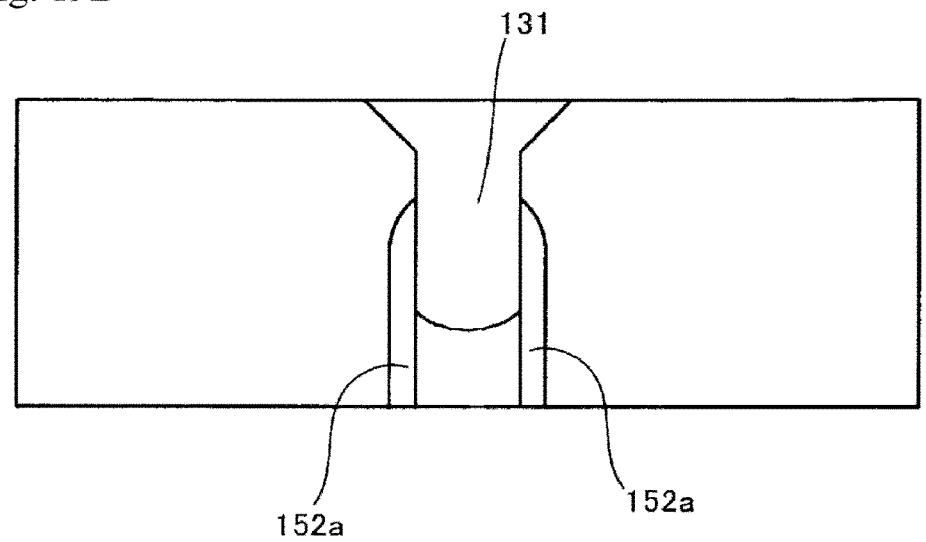
FIG. 19B is a partial enlarged view of the first mold 130 and the second mold 150 being combined with each other.

By combining the first mold 130 and the second mold 150 illustrated by an arrow of straight line in FIG. 18, and by combining the protrusion portion 131 of the first mold 130 being put into between the two plates 152a of the second mold 150, as can be ascertained from FIGS. 19A and 19B, the outer shape becomes a shape of the holding groove 52 provided in the holding projection 51 of the main body 45. Therefore, in this state, by the injection molding, the part becomes the holding groove 52. In addition, after hardening the material, both plates 152a may be released by separating the plates 152a from each other on the contrary to the arrow of the straight line illustrated in FIG. 18. At this time, since there is not an undercut which acts to interfere with the releasing in the first mold 130 and the second mold 150, the releasing is also smoothly performed. Therefore, by providing a shape similar to the holding portion 50, the manufacturing also becomes easy by the injection molding, and the productivity is also improved from such a point of view.

Next, another example of the manufacturing of the main body 45 of the bearing member 41 in the end member 40, will be described. Since the manufacturing method in the related art can be employed at a part except for the main body 45, here, the description thereof will be omitted. However, in the example, since it is not necessary to provide the forming portion 52d in the holding groove 52, it is possible to improve a degree of freedom of the shape from such a point of view.

In the example, the main body 45 is also formed by the injection molding. In other words, the main body 45 is formed by combining the plurality of molds, by performing the hardening by injection filling or the like a material to a cavity portion of the combined mold, and by disengaging the mold. Therefore, in molding the main body 45, a mold for forming a shape on the outer circumferential side and on the inner side of the tubular body 46 becomes necessary. In molding the main body 45, since forming of the shape on the inner side of the main body 45 is characteristic, here, the molding on the inner side will be described. In addition, the shape (for example, gear 48) on the outer circumferential side of the main body 45 can be molded similar to the related art.

Figure 20A:
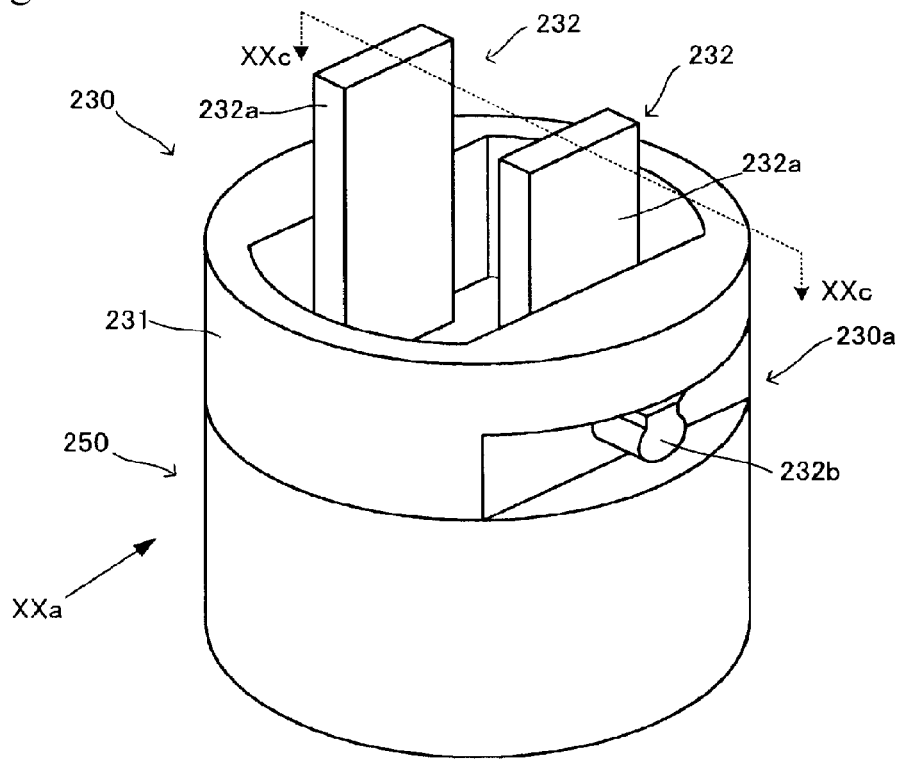
FIG. 20A is a perspective view illustrating a first mold 230 and a second mold 250 being combined with each other.
Figure 20B:
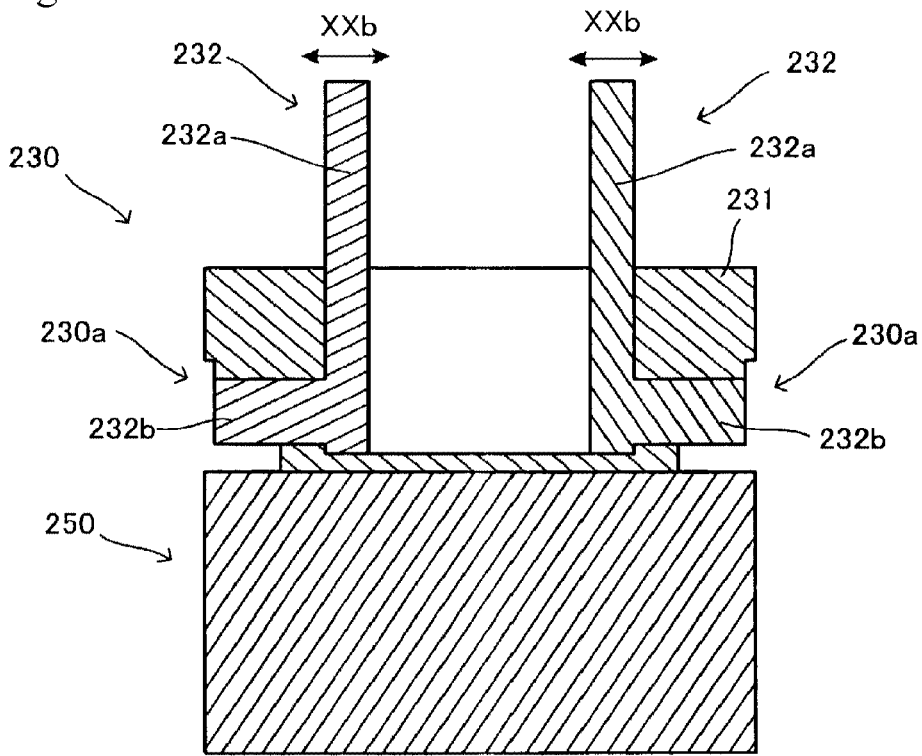
FIG. 20B is a sectional view of FIG. 20A.

FIG. 20A illustrates a perspective view of a state where the first mold 230 and the second mold 250 which form a shape on the inner side of the main body 45 are combined with each other. FIG. 20B illustrates a sectional view cut along line illustrated by XXc-XXc in FIG. 20A.

As can be ascertained from FIG. 20, in the example, the shape on the inner side of the main body 45 is molded by two molds.

The first mold 230 includes a cylindrical body 231 having a bottom on one side, and a cut 230a having a surface orthogonal to the axial direction of the cylindrical body 231 and a surface along the axial direction at a part thereof. The cut 230a is a cut having an L shape in a front view (viewpoint viewed from the direction illustrated by an arrow XXa in FIG. 20). The cuts 230a are provided on both sides nipping the axis of the cylindrical body 231.

In addition, the first mold 230 is provided with a sliding member 232. The sliding member 232 is provided with a plate-like operating portion 232a and a mold portion 232b which stands on one end side on one surface of the operating portion 232a. The mold portion 232b has a shape which corresponds to the holding groove 52 of the holding projection 51 to be formed in the holding projection 51 of the main body 45.

Figure 21A:
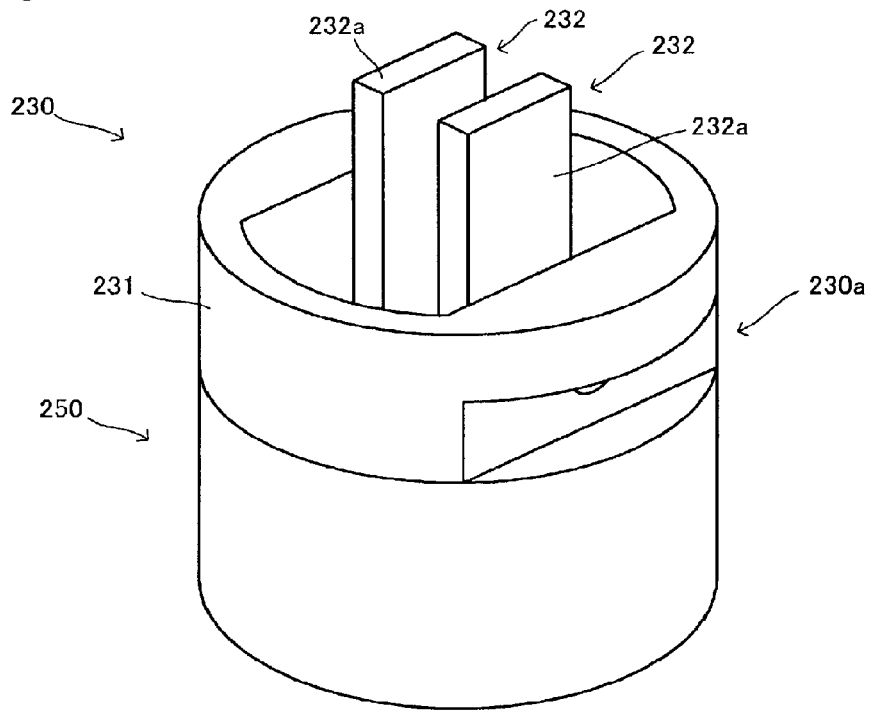
FIG. 21A is a perspective view illustrating the first mold 230 and the second mold 250 being combined with each other after transformation.
Figure 21B:
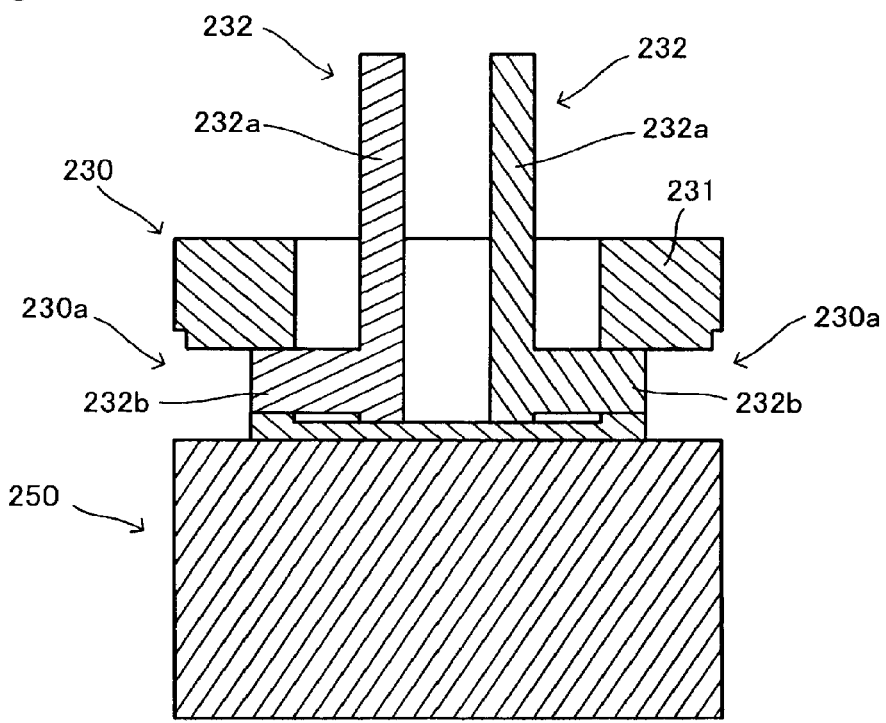
FIG. 21B is a sectional view of FIG. 21A.

In addition, as can be ascertained from FIGS. 20A and 20B, in the sliding member 232, the operating portion 232a is disposed on the inner side of the cylindrical body 231, and the mold portion 232b passes through the surface along the axial direction in the cut 230a, and protrudes to the cut 230a. In addition, the sliding member 232 can move in the direction (the diameter direction of the cylindrical body 231) illustrated by an arrow XXb in FIG. 20B. The moving direction is the direction different from the moving direction in which the first mold 230 is released. Accordingly, a posture in which the mold portion 232b moves in the direction different from the moving direction for releasing the first mold 230, and the mold portion 232b protrudes to the inner side of the cut 230a from the front surface of the mold, and a posture (buried posture) in which the mold portion 232b does not protrude to the cut 230a from the mold front surface, are switched, and the releasing can be performed. In FIGS. 21A and 21B, a situation in which the mold portion 232b does not protrude in the cut 230a, is illustrated. FIGS. 21A and 21B are views from the same viewpoint as those of FIGS. 20A and 20B.

Meanwhile, the second mold 250 is a columnar member.

According to the first mold 230 and the second mold 250 which are described above, before performing the injection of the material when performing the injection molding, as illustrated in FIGS. 20A and 20B, the mold portion 232b protrudes to the inner side of the cut 230a, and after this, when the material is injected, a groove portion which corresponds to the shape of the mold portion 232b can be formed. In addition, after hardening the material, as illustrated in FIGS. 21A and 21B, by excluding the mold portion 232b from the inner side of the cut 230a, regardless of the shape of the mold portion 232b, the first mold 230 and the second mold 250 can be smoothly released.

Therefore, in the first mold 230 and the second mold 250 of the example, when performing the releasing, it is possible to perform the deformation without interfering with the releasing, the manufacturing is also easy by the injection molding, and the productivity is improved from such a point of view.

Figure 22:
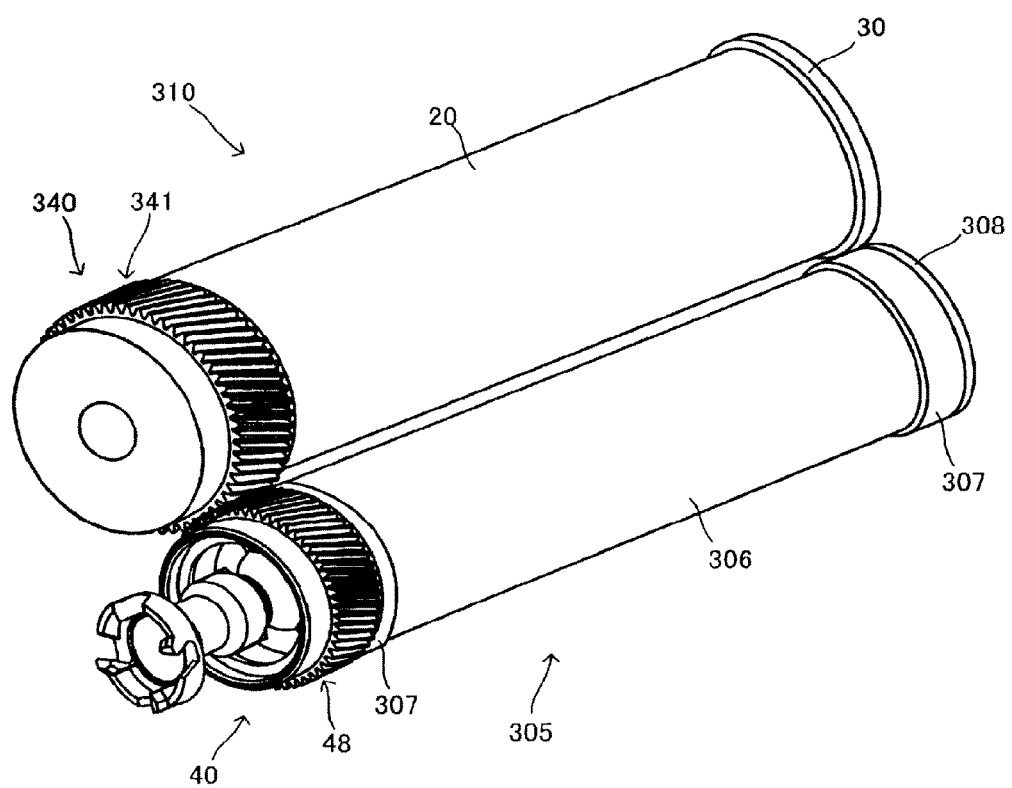
FIG. 22 is a view illustrating an embodiment in which the end member 40 is provided in a developing roller unit 305.

Above, an embodiment in which all of the described end members are disposed in the end portion of the photoreceptor drum 20, and accordingly, the photoreceptor drum unit is formed, is described. Meanwhile, from FIG. 2, as described above, the developing roller unit and the charging roller unit which are provided with a drum-like member are additionally provided in the process cartridge. Here, instead of disposing all of the end members according to the above-described embodiment and the modification example, in the photoreceptor drum, the rotation driving force can be received from the apparatus main body by employing the members in the developer roller unit or the charging roller unit. In FIG. 22, the developing roller unit 305 provided with the end member 40 is illustrated as one embodiment. In FIG. 22, a perspective view of a photoreceptor drum unit 310 which is disposed to match the developing roller unit 305 and be adjacent thereto, is also illustrated.

The developing roller unit 305 is provided with a developing roller 306, a spacer ring 307, a lid material 308, a magnetic roller (not illustrated), and the end member 40. The end member 40 is described above. In addition, known members can be employed as the other members, but for example, members having the following configuration is provided.

The developing roller 306 is a member which coats a developing layer on the outer circumferential surface of the columnar rotating body. In the embodiment, the developing roller 306 is a conductive cylinder, such as aluminum, or here, the developing roller 306 is configured to be coated with a material which configures the developing layer.

The spacer ring 307 is an annular member which is disposed to be wound on the outer circumferential surface of each of the both ends of the developing roller 306, and accordingly, a void between the developing roller 306 and the photoreceptor drum 20 is held to be constant. The thickness of the spacer ring 307 is approximately from 200 μm to 400 μm.

Similar to the above lid material 30, the lid material 308 is disposed on one end side of the developing roller 306, and at the one end of the developing roller unit 305, the developing roller 306 becomes a bearing for the rotation around the axis.

The magnetic roller is not illustrated in FIG. 22 since the magnetic roller is disposed on the inner side of the developing roller 306, but a plurality of magnetic poles are disposed along the axis by the roller formed of a magnetic body and the resin including a magnetic body. Accordingly, by using a magnetic force, the developer can be adsorbed to the front surface of the developing roller 306.

The end member 40 is as described above, but the end member 40 is disposed in the end portion opposite to the end portion in which the lid material 308 is disposed among the end portions of the developing roller 306. Here, an example in which the end member 40 is employed is illustrated, but not being limited thereto, any of the end members described above can also be employed.

In addition, at this time, the photoreceptor drum unit 310 can be configured as follows, for example. In other words, the photoreceptor drum unit 310 is provided with the photoreceptor drum 20, and the lid material 30 and an end member 340 which are bearings that rotate the photoreceptor drum 20 around the axis at each of the both ends of the photoreceptor drum 20. At this time, in one end member 340, a gear portion 341 which is meshed with the gear 48 of the end member 40 disposed in the developing roller unit 305 and receives the rotating force, is provided.

As described above, each end member may be a configuration member which is included in the developing roller unit, and even in this case, each end member acts similar to that when the end member is included in the photoreceptor drum unit.

The present application is based on Japanese Patent Application No. 2014-118083 filed on Jun. 6, 2014, and the contents thereof are included here for reference.

REFERENCE SIGNS LIST

1 IMAGE FORMING APPARATUS
2 IMAGE FORMING APPARATUS MAIN BODY (APPARATUS MAIN BODY)
3 PROCESS CARTRIDGE
10 PHOTORECEPTOR DRUM UNIT
20 PHOTORECEPTOR DRUM (COLUMNAR ROTATING BODY)
40 END MEMBER
41 BEARING MEMBER
45 MAIN BODY
50 HOLDING PORTION
60 INTERMEDIATE MEMBER
70 SHAFT MEMBER
305 DEVELOPING ROLLER UNIT
306 DEVELOPING ROLLER (COLUMNAR ROTATING BODY)

The invention claimed is:

1. An end member which is disposed in an end portion of a columnar rotating body, comprising:
a bearing member; and
a shaft member,
wherein the bearing member includes a main body having a tubular body and a holding portion disposed on an inner side of the tubular body, and an intermediate member held by the holding portion of the main body,
wherein one end side of the shaft member is held by the intermediate member,
wherein the shaft member includes a rotating shaft, a rotating force receiving portion which is disposed at one end of the rotating shaft and receives a rotating force, a base end portion which is disposed at the other end of the rotating shaft, and a rotating force transmission projection which protrudes from the base end portion,
wherein the base end portion of the shaft member includes a part of a spherical surface,
wherein the intermediate member is jointed to the holding portion of the main body to be rotatable around one axis, and
wherein the shaft member is jointed to the intermediate member to be rotatable around an axis which is different from the axis of rotation of the intermediate member.

2. The end member according to claim 1, wherein the intermediate member has an annular shape, in which the base end portion is disposed on an inner side of the annular shape, and the intermediate member includes a shaft member linking groove into which the rotating force transmission projection is inserted, and
wherein the rotating force transmission projection and the shaft member linking groove are jointed to each other.

3. The end member according to claim 2, wherein the base end portion is provided with a gap such that the base end portion does not come into contact with the intermediate member.

4. The end member according to claim 1,
wherein the intermediate member includes a main body linking projection which is a projection that is inserted into the holding portion,
wherein the holding portion includes a holding groove which is a groove into which the main body linking projection is inserted, and
wherein the main body linking projection and the holding groove are jointed to each other.

5. The end member according to claim 1, wherein the axis of rotation of the intermediate member and the axis of rotation of the shaft member are disposed on the same plane.

6. A bearing member which is included in an end member disposed in an end portion of a columnar rotating body, comprising:
a main body which has a tubular body and a holding portion disposed on an inner side of the tubular body; and
an intermediate member which is held by the holding portion of the main body,
wherein the intermediate member is jointed to the holding portion of the main body to be rotatable around one axis.

7. A bearing member which is included in an end member disposed in an end portion of a columnar rotating body, comprising:
a main body which has a tubular body and a holding portion disposed on an inner side of the tubular body,
wherein the holding portion includes a holding groove which is a groove that extends in a direction along a direction in which an axis of the tubular body extends,
wherein the shaft member has a size by which the shaft member is accommodated in the inner side of the ring of the intermediate member, and
wherein a jointing protrusion portion is formed at a part in the extending direction of the holding groove.

8. A photoreceptor drum unit comprising:
a photoreceptor drum which is the columnar rotating body; and
the end member according to claim 1 which is attached to at least one end portion in an axial direction of the photoreceptor drum.

9. A developing roller unit comprising:
a developing roller which is the columnar rotating body; and
the end member according to claim 1 which is attached to at least one end portion in an axial direction of the developing roller.

10. A process cartridge comprising:
a housing; and
the photoreceptor drum unit according to claim 8 which is held by the housing.

11. A process cartridge comprising:
a housing; and
the developing roller unit according to claim 9 which is held by the housing.

12. A manufacturing method of a bearing member which is a method of manufacturing the bearing member according to claim 7, comprising forming the bolding groove of the bearing member by an injection molding,
 wherein the injection molding is performed by combining a protrusion portion, which does not include an undercut portion and is provided in a first mold and a protrusion portion, which does not include an undercut portion and is provided in a second mold, and a mold release is performed by pulling apart the first mold and the second in opposite directions.

13. A manufacturing method of a bearing member which is a method of manufacturing the bearing member according to claim 7, comprising forming the holding groove of the bearing member by an injection molding,
 wherein the injection molding is performed by protruding a mold portion which is a piece having a shape of the holding groove, in a direction different from a releasing direction from a surface of a mold, and a mold release is performed after burying the mold portion in the surface of the mold.

* * * * *